US009380066B2

United States Patent
Hohndel et al.

(10) Patent No.: US 9,380,066 B2
(45) Date of Patent: Jun. 28, 2016

(54) DISTRIBUTED TRAFFIC PATTERN ANALYSIS AND ENTROPY PREDICTION FOR DETECTING MALWARE IN A NETWORK ENVIRONMENT

(71) Applicant: Intel Corporation, Santa Clara, CA (US)

(72) Inventors: Dirk Hohndel, Portland, OR (US); Adriaan van de Ven, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 115 days.

(21) Appl. No.: 13/853,601

(22) Filed: Mar. 29, 2013

(65) Prior Publication Data
US 2014/0298461 A1    Oct. 2, 2014

(51) Int. Cl.
H04L 29/06    (2006.01)
G06N 3/12    (2006.01)
G06F 21/55    (2013.01)
G06F 21/56    (2013.01)

(52) U.S. Cl.
CPC .......... H04L 63/1416 (2013.01); G06F 21/554 (2013.01); G06F 21/56 (2013.01); G06N 3/126 (2013.01)

(58) Field of Classification Search
CPC ...................................................... H04L 63/14
See application file for complete search history.

(56) References Cited

U.S. PATENT DOCUMENTS

| 7,877,808 B2 | 1/2011 | van de Ven |
| 8,069,484 B2 | 11/2011 | McMillan et al. |
| 8,176,554 B1 * | 5/2012 | Kennedy .......................... 726/23 |
| 8,291,497 B1 | 10/2012 | Griffin et al. |
| 2006/0259967 A1 * | 11/2006 | Thomas et al. .................. 726/22 |
| 2007/0152854 A1 * | 7/2007 | Copley .................. G06F 21/562 341/51 |

(Continued)

FOREIGN PATENT DOCUMENTS

| WO | WO 2007-078981 A1 | 7/2007 |
| WO | WO 2009-014779 A2 | 1/2009 |
| WO | WO 2014/160901 A1 | 10/2014 |

OTHER PUBLICATIONS

International Search Report and Written Opinion in International Application No. PCT/US2014/032090, mailed Aug. 28, 2014, 11 pages.

(Continued)

*Primary Examiner* — Andrew Nalven
*Assistant Examiner* — Mary Li
(74) *Attorney, Agent, or Firm* — Patent Capital Group

(57) ABSTRACT

Technologies are provided in embodiments to detect malware. The embodiments are configured to receive an entropy rate of a potentially affected system. The embodiments are further configured to compare the entropy rate to an average entropy rate, and to determine a probability that the potentially affected system is infected with malware. The probability is based, at least in part, on a result of the comparison. More specific embodiments can include the received entropy rate being generated, at a least in part, by a genetic program. Additional embodiments can include a configuration to provide the potentially affected system with a specified timespan associated with the genetic program. The specified timespan indicates an amount of time to observe context information on the potentially affected system. In at least some embodiments, the result of the comparison includes an indicator of whether the entropy rate correlates to an infected system or a healthy system.

25 Claims, 10 Drawing Sheets

(56) References Cited

U.S. PATENT DOCUMENTS

| | | | |
|---|---|---|---|
| 2007/0242771 A1* | 10/2007 | Kondo | 375/295 |
| 2008/0184367 A1* | 7/2008 | McMillan et al. | 726/23 |
| 2011/0197281 A1 | 8/2011 | Alme et al. | |
| 2012/0174227 A1* | 7/2012 | Mashevsky et al. | 726/24 |

OTHER PUBLICATIONS

Davis, Tom, "Utilizing Entropy to Identify Undetected Malware," Guidance Software Whitepaper, 2009, 11 pages.

International Preliminary Report on Patentability in International Application No. PCT/US2014/032090, mailed Oct. 8, 2015, 10 pages.

* cited by examiner

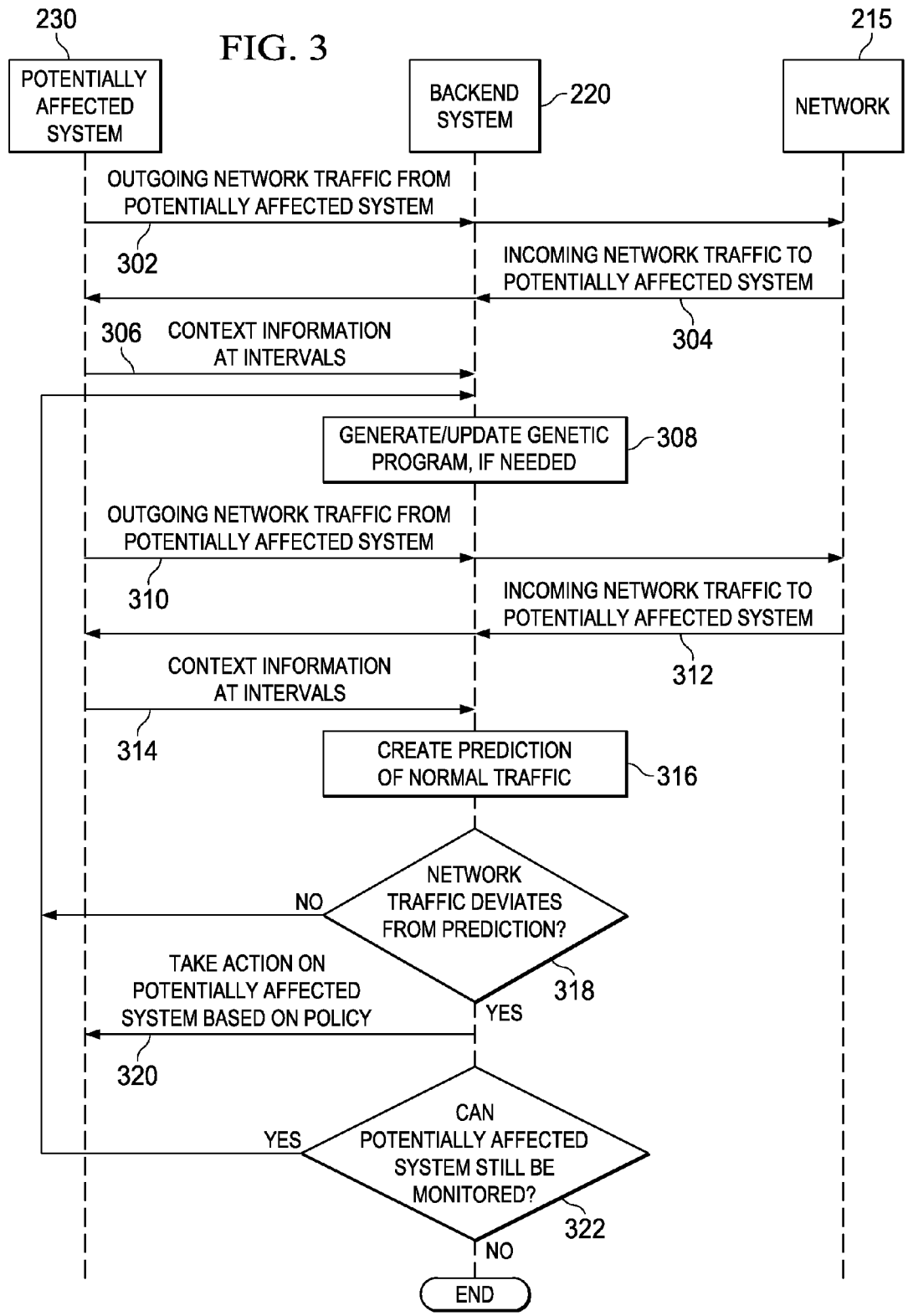

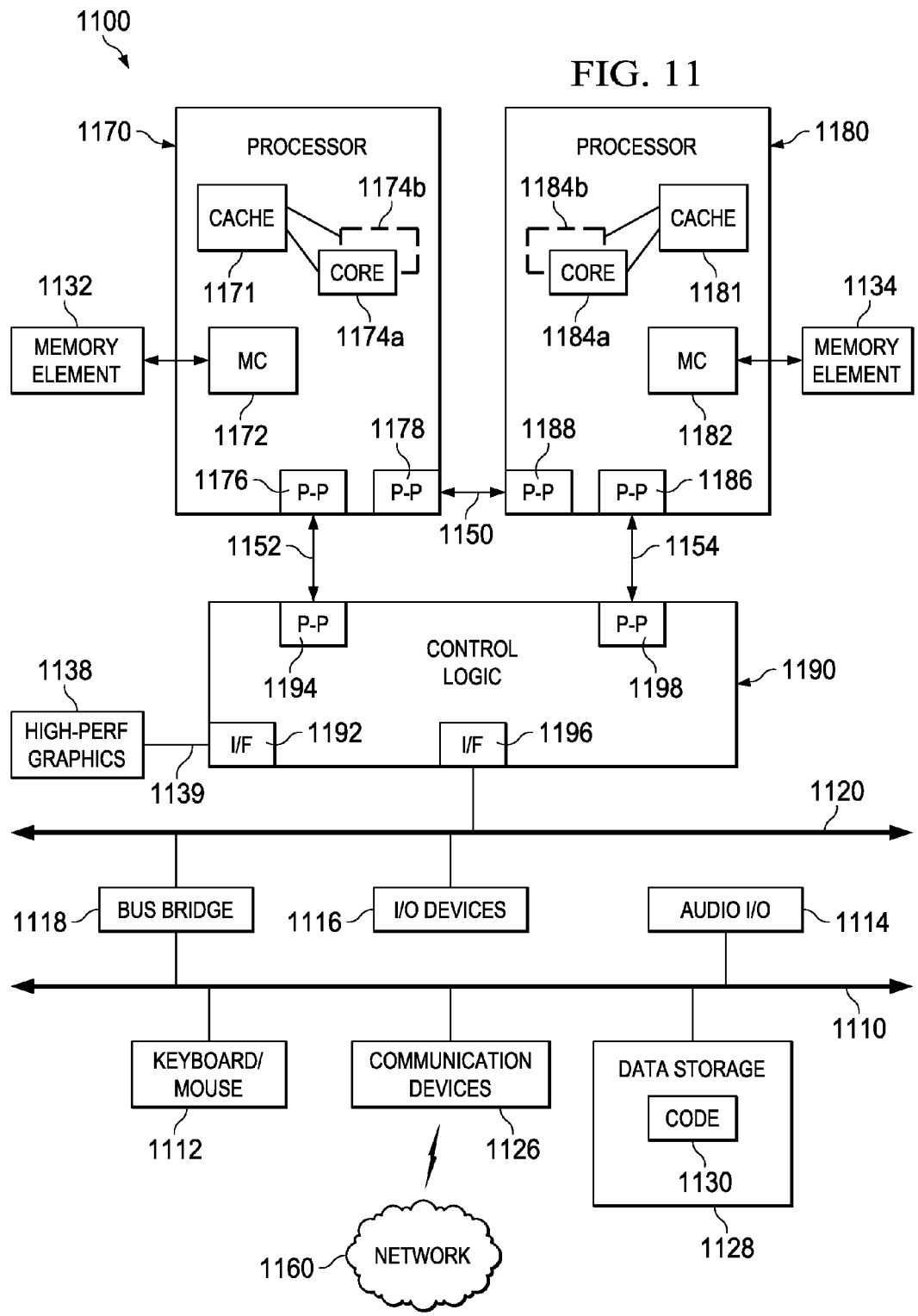

DISTRIBUTED TRAFFIC PATTERN ANALYSIS AND ENTROPY PREDICTION FOR DETECTING MALWARE IN A NETWORK ENVIRONMENT

TECHNICAL FIELD

This disclosure relates in general to the field of information security, and more particularly, to distributed traffic pattern analysis and entropy prediction for detecting malware in a network environment.

BACKGROUND

The field of network security has become increasingly important in today's society. The Internet has enabled interconnection of different computer networks all over the world. In particular, the Internet provides a medium for exchanging electronic communications between various systems in the same or different computer networks. While the use of the Internet and other networking infrastructures has transformed business and personal communications, it has also become a vehicle for malicious operators to gain unauthorized access to systems and networks and for intentional or inadvertent disclosure of sensitive information.

Malicious software ("malware") that infects a system may be able to perform any number of malicious actions, such as sending out spam or malicious emails from the host system, stealing sensitive information from a business or individual associated with the host system, propagating to other host system, assisting with distributed denial of service attacks and/or sabotage or espionage (or other forms of cyber-warfare), for example. Many different approaches for detecting malware on potentially affected systems are available. Scanners are often used on endpoint devices to detect code signatures, system modifications, or behavioral patterns. Other approaches involve scanning an infrastructure component to detect malware in network communications. Nevertheless, some malware still eludes detection, for example, by attacking or modifying the malware detection system itself or because the malware detection system has insufficient contextual knowledge of the potentially affected system. Hence, significant administrative challenges remain for protecting computers and computer networks from malware.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified interaction diagram illustrating example operations in a malware detection system with distributed traffic pattern analysis according to at least one embodiment;

FIG. 11 is a block diagram of an example computing system that is arranged in a point-to-point (PtP) configuration according to an embodiment.

DETAILED DESCRIPTION OF EMBODIMENTS

Figure 1:
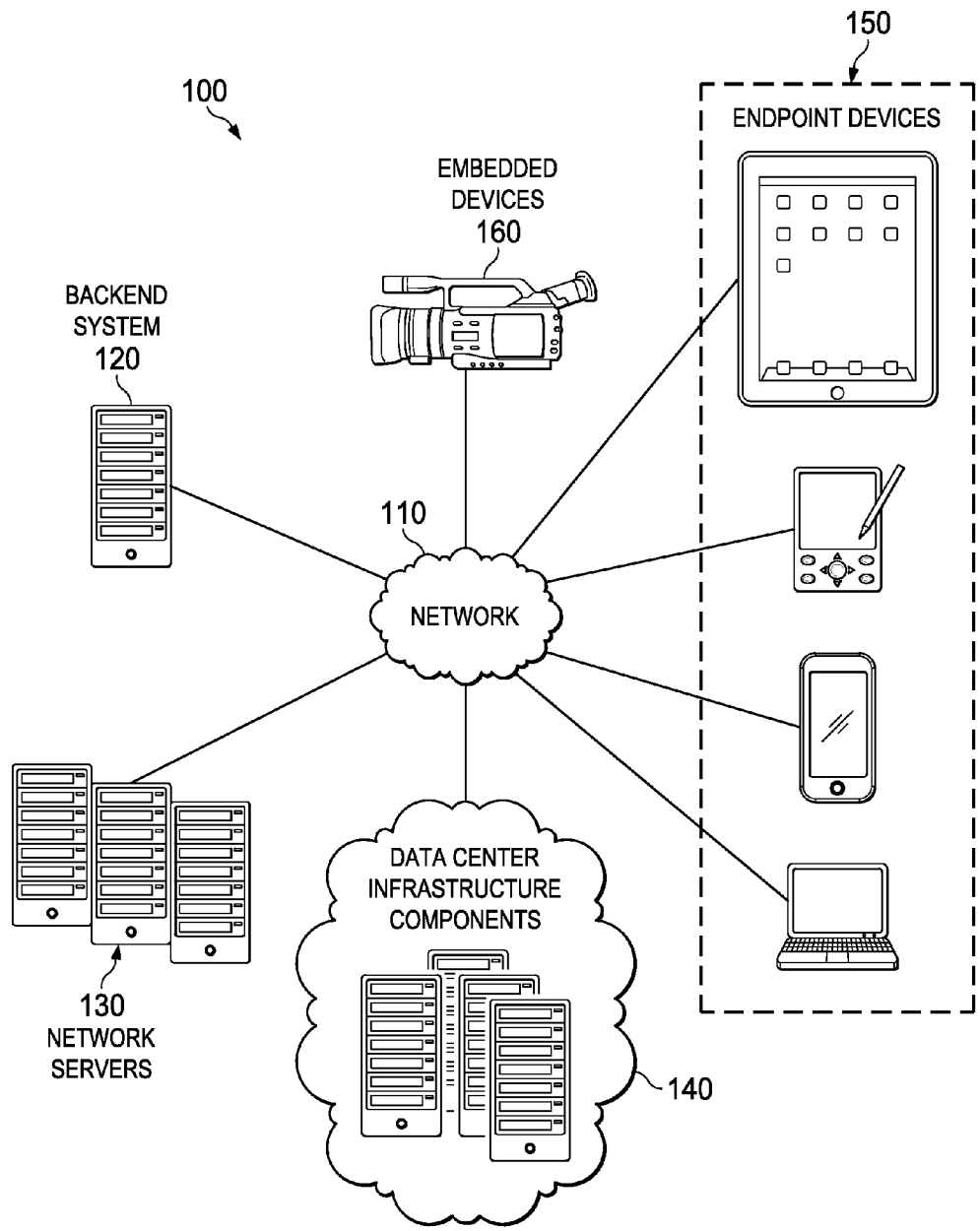
FIG. 1 is a simplified block diagram of a network environment in which embodiments of a system for detecting malware may be implemented in accordance with the present disclosure.

FIG. 1 is a simplified block diagram of an example network environment 100 in which a system for detecting malware according to the present disclosure can be implemented. Network environment 100 may include a backend system 120 adapted to operate in connection with one or more potentially affected systems to provide, in some embodiments, distributed traffic analysis functions to detect malware on the potentially affected systems. In other embodiments, backend system 120 is adapted to operate in connection with one or more potentially affected systems to provide entropy prediction functions to detect malware on the potentially affected systems. A potentially affected system is a computing device capable of being infected with malware. Generally, potentially affected systems can include (but are not limited to) network servers 130, data center infrastructure components 140, endpoint devices 150, and embedded devices 160. As used herein, an 'infected system' is intended to mean a computing device that contains malware, and a 'healthy system' is intended to mean a computing device that does not contain malware.

These potentially affected systems may communicate with other systems and with other networks via network 110. Network 110 can include one or more public networks, one or more private networks, or any combination thereof. In some embodiments using distributed traffic analysis for detecting malware, backend system 120 may communicate with potentially affected systems within a private network. In at least some other embodiments using entropy prediction for detecting malware, backend system 120 may communicate with potentially affected systems remotely over network 110. These networks may be inclusive of wire line technologies (e.g., Ethernet, etc.) and wireless technologies (e.g., Institute of Electrical and Electronics Engineers (IEEE) Std 802.11™-2012, published Mar. 29, 2012, IEEE Std 802.16™-2012, published Aug. 17, 2012, WiFi, WiMax, Dedicated short Range Communications (DSRC), etc.), satellite, cellular technologies (e.g., 3G/4G/5G/nG, etc.), other radio frequencies (e.g., near field communications (NFC), radio frequency identification (RFID), etc.), and/or any other networking protocols that facilitate network communications in a network environment.

Generally, 'servers,' 'clients,' 'devices,' 'computers,' 'network elements,' 'potentially affected systems,' 'backend system,' 'network servers,' 'data infrastructure components,' 'endpoint devices,' and 'embedded devices' (e.g., 120, 130, 140, 150, 160) as used herein, can comprise computing devices operable to receive, transmit, process, store, and/or manage data and information associated with embodiments disclosed herein. These computing devices can each include one or more processors, computer-readable memory, and any suitable hardware, software, firmware, components, modules, or objects that facilitate the operations thereof. These computing devices may also include interfaces employing any suitable connection (wired or wireless) for receiving, transmitting, and/or otherwise communicating data or information in network environment 100. This may be inclusive of appropriate algorithms and communication protocols that allow for the effective exchange of data or information. Additionally, computing devices may be configured to execute any operating system (e.g., Linux, UNIX, Windows, Windows Server, etc.) to manage the hardware components therein. Further, some computing devices may include virtual machines adapted to virtualize execution of a particular operating system.

Servers 130 can include any suitable software component or module, or computing device(s) capable of hosting and/or serving software applications and other programs, including local, distributed, enterprise, or cloud-based software applications. Servers 130 can include, but are not limited to, database servers, file servers, mail servers, print servers, web servers, gaming servers, etc. In some instances, some combination of servers can be hosted on a common computing system, server, or server pool, and share computing resources, including shared memory, processors, and interfaces, such as in an enterprise software system providing services to a plurality of distinct clients and customers.

Computing devices (e.g., 120, 130, 140, 150, 160) in network environment 100 can also include devices implemented as one or more local and/or remote endpoint devices 150 (also referred to as 'clients'), such as personal computers, laptops, cell phones, smartphones, tablet computers, personal digital assistants, media clients, infotainment systems (e.g., in transportation equipment such as automobiles, airplanes, trains, etc.), web-enabled televisions, telepresence systems, gaming consoles, mobile internet devices, and other devices adapted to receive, send, or otherwise communicate in network environment 100. An endpoint device can include any computing device operable to connect or communicate at least with servers, other endpoint devices, network 110, and/or other computing devices using a wireline or wireless connection. In general, endpoint devices 150 can include any electronic computing device operable to receive, transmit, process, and store any appropriate data associated with the network environment of FIG. 1. It will be understood that there may be any number of endpoint devices associated with network 110, as well as any number of endpoint devices external to network 110.

Computing devices in network environment 100 can also include devices implemented as one or more network elements that can facilitate communication between other computing devices and between networks, and/or that can enable communication and provide services, remotely or locally, in a network environment. Network elements can include network appliances, servers, routers, switches, gateways, bridges, load balancers, processors, modules, or any other suitable device, component, element, or object operable to exchange information in a network environment.

While FIG. 1 is described as containing or being associated with a plurality of elements, not all elements illustrated within network environment 100 of FIG. 1 may be utilized in each alternative implementation of the present disclosure. Additionally, one or more of the elements described herein may be located external to network 110, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

For purposes of illustrating certain example techniques of detecting malware in network environment 100 by distributed traffic pattern analysis or by entropy prediction, it is important to understand the communications that may be traversing the network environment. The following foundational information may be viewed as a basis from which the present disclosure may be properly explained.

Threats from both inbound and outbound network traffic can disrupt a computer network and lead to unstable and/or insecure systems. As used herein, a 'threat' includes malicious software (malware), which is a broad term commonly used to describe software designed to engage in hostile and/or unwanted behavior on a computer, and generally includes any software designed to interfere with the normal operation of a computer or network, to gain unauthorized access to a computer system, and/or to steal, destroy, disclose, or modify data. Examples of malware can include, but are not limited to, viruses, spam, phishing scams, denial-of-service (DOS) attacks, directory harvest, botnets, spyware, adware, trojans, and worms. Threats can also include emails that are not compliant with network policies and/or emails that contain sensitive or confidential information and that are not authorized to communicate that information.

One common approach to malware detection involves scanning potentially affected systems (PAS's) to identify known signatures of malware. Some scanning approaches involve provisioning protection devices in a network to receive certain network traffic such as electronic messages (email). Email messages can be decomposed and scanned for viruses or other malware such as spam, before being sent to a destination host. Other approaches involve scanning on a PAS for system modifications or behavioral patterns, that are known to indicate malware. In further approaches, a scanner can run on network element such as a switch, router, server, etc. to detect patterns of malware in the network communications of a PAS. All of these approaches typically use a set of signatures or patterns, that are known to indicate malware or that indicate behavior or modifications indicative of malware. Accordingly, unknown malware that infects a PAS may not be detected until the malware is identified, new signatures or patterns are generated, and the signature or pattern set used by the PAS has been updated.

Current malware detection techniques, including monitoring installed and running software on a PAS, and monitoring observed network traffic communications associated with a PAS, can be deficient in certain scenarios. A scanner running on a PAS, for example, can potentially be disabled or modified by malware that has infected the PAS. Thus, a disabled or modified scanner may not be effective in detecting malware or initiating remedial actions that may be needed. In another scenario, a scanner running on an infrastructure component (e.g., a switch) to monitor network communications of a PAS may have insufficient knowledge of context and expected behavior of the PAS it is monitoring. Without sufficient knowledge of context and expected behavior, malware can be more easily modified to elude detection by the scanner.

Figure 2:
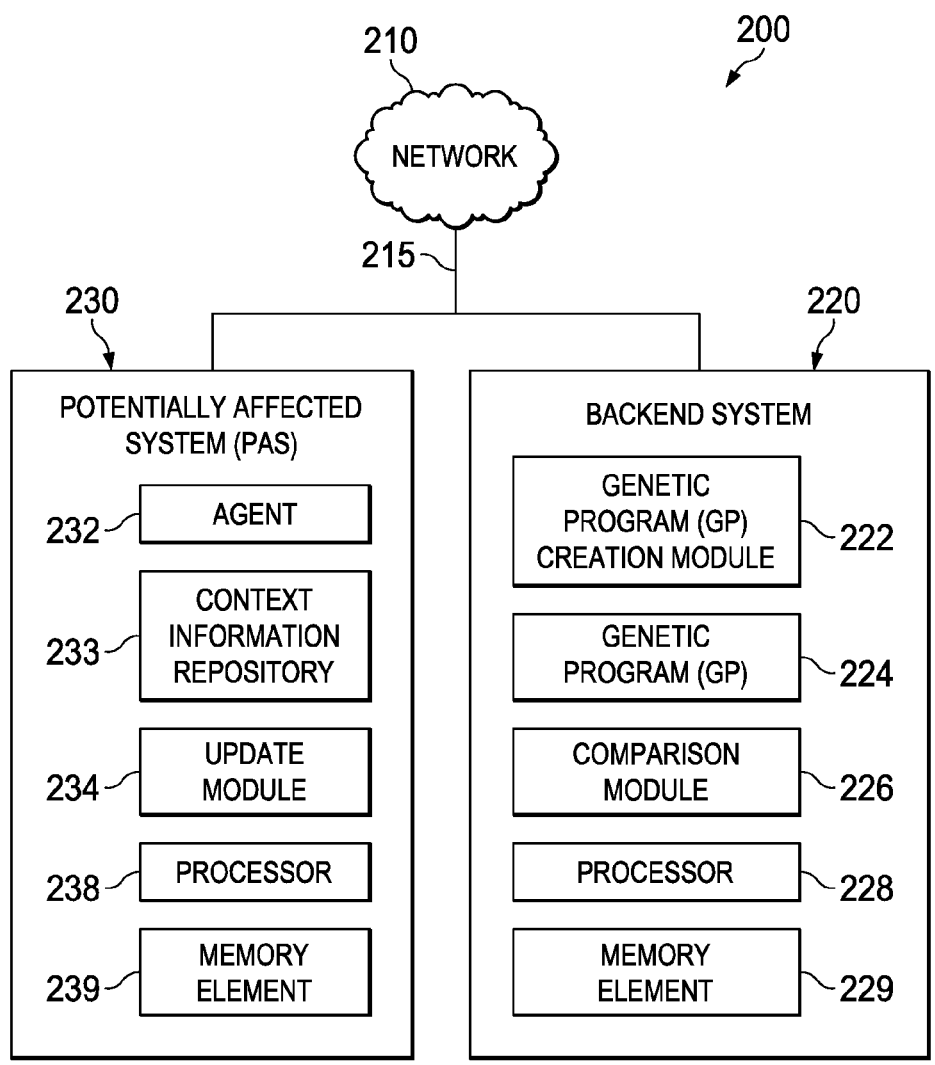
FIG. 2 is a simplified block diagram of a malware detection system including distributed traffic pattern analysis according to at least one embodiment.

A malware detection system 200 using distributed traffic pattern analysis in a network environment, as outlined in FIG. 2, can resolve these issues (and others). A malware detection system using distributed traffic pattern analysis monitors changes in behavior of a potentially affected system (PAS) in order to identify a malware infection on the PAS. Behavioral changes can be detected on the infrastructure side, which makes it more difficult for the attacking malware to prevent detection. Also, current context of the PAS is evaluated, which significantly increases the ability to predict normal network traffic of the PAS at any given time. Thus, actual network traffic of a PAS can be monitored and evaluated to determine whether it deviates at least a certain amount from the expected normal network traffic of that PAS. If the deviation of the actual network traffic is within a range of acceptable deviation, then the PAS is likely not infected with malware. However, if the deviation of the actual network traffic is outside the range of acceptable deviation, then the PAS may be infected with malware. In other embodiments, a degree of deviation can indicate a relative likelihood that the PAS is infected with malware. Thus, embodiments of malware detection system 200 can detect a threat on a PAS without necessarily having any knowledge of the particular threat that is detected.

FIG. 2 illustrates a simplified example of malware detection system 200 using distributed traffic pattern analysis. For ease of illustration, a single potentially affected system (PAS) 230 and a backend system 220 are shown in communication in a protected network 215, that connects to a public network 210, such as the Internet. Generally, malware detection system 200 can be implemented in any type or topology of networks. Protected network 215 and public network 210 each represent a series of points or nodes of interconnected communication paths for receiving and transmitting packets of information that propagate through malware detection system 200. These networks offer a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. As previously described herein with reference to FIG. 1, these networks may be inclusive of any number of wire line and wireless technologies, including satellite, cellular, and other radio frequencies, for example.

In malware detection system 200, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)).

A packet is a unit of data that can be routed between a source node and a destination node on a packet switched network, such as Internet 210. A packet includes a source network address and a destination network address. By way of example, these network addresses can be Internet Protocol (IP) addresses in a TCP/IP messaging protocol. The term 'data' as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

As referred to herein, a 'protected network', such as protected network 215, is intended to mean a network that is owned or otherwise under the control of a particular entity or organization, and that may be configured for protection against threats from inbound network traffic. Communications attempting to reach certain nodes in a protected network, such as PAS 230, may first be routed through one or more network elements of the protected network, such as a gateway, firewall, proxy server, security appliance, etc. In an example embodiment, a protected network may be a private network that uses private address space (e.g., Internet Protocol (IP) address space) for its nodes on the network. A protected network may also or alternatively implement any other suitable forms of address spacing that allows a particular entity or organization to control network communications to and from the protected network.

In at least one embodiment, as shown in FIG. 2, PAS 230 may include an agent 232, a context information repository 233, and an update module 234. Backend system 220 may include a genetic program (GP) creation module 222, a genetic program 224, and a comparison module 226. PAS 230 and backend system 220 may each include at least one processor 238 and 228, respectively, and at least one memory element 239, and 229, respectively.

In an embodiment, agent 232 is adapted to observe the context on PAS 230. This observation may be performed continually in at least one embodiment. Agent 232 may store context information in context information repository 233, which can be internal to PAS 230 or external (entirely or in part). Internal storage could include any internal memory of PAS 230, such as static storage, random access memory (RAM), or cache, for example. External storage could include a network storage technique such as network attached storage (NAS) or storage area network (SAN), or the internal memory of another network element. The context of a PAS is generally information related to the functioning of the PAS and can include, but is not limited to time, location, type of applications, applications currently executing, user presence, user identification, etc. The context observed for a particular PAS may depend upon the device type of the PAS. For example, if the PAS is a mobile device, location and user information may be relevant, whereas if the PAS is a server, type of applications and type of clients connected to the PAS, may be more relevant. In an embodiment, the context information of a PAS can be merged to create a unique fingerprint of that PAS at any given time.

PAS 230 may also be configured to communicate with backend system 220 via agent 232. In at least one embodiment, backend system 220 is provisioned in the network infrastructure of network 215, separate from the one or more PAS's being monitored, but capable of observing network traffic associated with the PAS's being monitored. For example, a PAS that is a mobile phone could be configured to communicate with a backend system implemented by a network carrier. In another example, a PAS in a data center could be configured to communicate with a backend system implemented at or behind a switch connected to the PAS. An advantage of backend system 220 being provisioned separately from the one or more PAS's being monitored is the ability to protect the monitoring logic from being disabled or modified by malware that attacks a PAS. In some other embodiments, however, the functionality of backend system 220, or portions thereof, may be implemented on a PAS itself, or in any other computing system that is accessible to the one or more PAS's being monitored and that is capable of observing network traffic associated with the PAS's.

Communication between agent 232 and backend system 220 may be configured to have an ongoing heartbeat or handshake. In an example of a heartbeat communications protocol, an update module 234 may continually send messages to backend system 220 at given intervals of time. The messages can contain context information of PAS 230, which can be retrieved from context information repository 233 in at least one embodiment.

In an example of a handshaking protocol, update module 234 may send a message to backend system 220 to determine whether backend system 220 is ready to receive a message from PAS 230. If backend system 220 is ready, PAS 230 may send the message containing context information of PAS 230. Handshaking may occur based on a time interval or based on an event, such as each time new context information is detected or each time a particular type of context information is detected. Thus, in certain implementations where messages are sent to backend system 220 each time new context information is detected, context information repository 233 may not be utilized. In implementations where messages are sent to backend system 220 based on a time interval, the selected time interval may depend on the type of device being monitored. For example, a mobile device with frequently changing context information may have a shorter interval period than a server with potentially more static context information. The heartbeat or handshake may also be used by backend system 220 to detect modifications to or disablement of agent 232 on PAS 230.

Backend system 220 can include a genetic program (GP) creation module 222 that creates a genetic program 224. In at least one embodiment, backend system 220 observes network traffic generated by PAS 230, and GP creation module 222 correlates the observed network traffic patterns with context information received from PAS 230. As used herein, 'network traffic pattern' is generally intended to mean regular or typical characteristics of network traffic including the type of traffic and the volume of traffic. Exemplary characteristics could include, but are not limited to, one or more of port connections, packet protocol, spacing between packets, amount of packets in a particular time frame, destination address of outgoing packet, source address of incoming packet, etc.

A genetic program is an algorithm-based methodology using ideas of biological evolution to create computer programs that can solve a complex problem, often with many fluctuating variables. Based on the correlation of observed network traffic patterns and context information, GP creation module 222 can create genetic program 224, which is able to predict normal traffic of PAS 230 given the current context of PAS 230. Genetic program 224 may be initially created based on the type of PAS being monitored, because different devices can have very different characteristics of network traffic. For example, a mobile phone may have context that changes more frequently than a data center server. Accordingly, in one embodiment, a genetic program created for a mobile phone may be created based on context received over a shorter period of time (or based on a greater amount of activity) than a genetic program created for a server. By way of illustration, and not of limitation, in an example implementation, genetic programs may be created from context information received anywhere between a number of seconds to a number of minutes, depending on the type of device. It will be apparent, however, that backend system 220 may be configured to create genetic programs based on any amount of time, depending on particular needs and implementations.

In at least one embodiment, genetic program 224 does not attempt to predict actual traffic generated by or received by PAS 230. Rather, genetic program 224 creates predictions of normal traffic given the current context of PAS 230. A prediction of normal traffic can include a type of network traffic and volume of network traffic expected from PAS 230. For example, connections by PAS 230 to ports 25, 587, or 993 may be expected types of TCP/IP network traffic on certain hosts if an email application is active, and connections to ports 80 and 443 may be expected types of TCP/IP network traffic on certain hosts if a web browser is active. It will be apparent that other types of network traffic, including different ports, protocols, applications, etc., may be applicable to other types of networks. For expected volume of traffic, communications with email servers or web servers may typically follow a fairly consistent pattern. Accordingly, genetic program 224 may predict the normal traffic (e.g., by day, time, application, user, etc.), based on volume (e.g., in the form of a range with maximum and minimum amounts) in at least some embodiments.

Backend system 220 can also be configured to update genetic program 224 as new context is received. The heartbeat (or handshake) communication between PAS 230 and backend system 220 can provide a continual feed of context information of PAS 230. In at least one embodiment, each time a new type of context information is received, backend system 220 updates genetic program 224, to account for the new type of context. Genetic program 224 may also need to be updated over a period of time, for example, when normal traffic for a specific context changes. The frequency at which backend system 220 updates genetic program 224 may be based on the type of PAS being monitored by the genetic program.

In one example scenario, a genetic program is created for a mobile phone that has a particular application. When the application is updated with a new version that creates new network traffic patterns, backend system 220 can correlate the context information received from PAS 230 with observations of actual network traffic of PAS 230, to update genetic program 224 to create predictions of normal traffic that map to the updated application. In another example scenario, use patterns could change when a user becomes interested in and begins using an application that has previously had little use. In this scenario, backend system 220 may update genetic program 224 to create predictions of normal traffic that map to the new use patterns of the application by the user.

By way of illustration, and not of limitation, in an example implementation, genetic programs may be updated, based on device type, anywhere between a number of seconds to a number of minutes. It will be apparent, however, that backend system 220 may be configured to update genetic programs based on any amount of time, depending on particular needs and implementations. An advantage of more frequent updates is the ability to minimize networking noise that can obfuscate malware, and to enable recognition of contextual changes that may be indicative of malware.

Comparison module 226 of backend system can be configured to compare actual observed network traffic of PAS 230 to the normal traffic predicted by genetic program 224. In at least one embodiment, if the observed network traffic from PAS 230 deviates beyond an acceptable deviation range for the currently observed context, then backend system 220 can assume that PAS 230 has been compromised and can take appropriate action. Examples of such actions could include alerting a user (e.g., a security administrator), logging the deviation, quarantining PAS 230, disabling network connectivity from PAS 230, etc. Additionally, there may be one or more acceptable deviation ranges (e.g., for volume of traffic, for type of traffic), and these one or more ranges may be controlled by policy and may be adjustable by an authorized user.

In at least one other embodiment, any degree of deviation may be relevant to a likelihood of PAS 230 being compromised. Accordingly, if the observed network traffic from PAS 230 deviates from the predicted normal traffic, then a determination regarding which one or more actions to take may depend on the degree of deviation (e.g., for volume of traffic, for type of traffic) that was detected. For example, if a slight deviation occurs, then backend system 220 may take an action such as logging the deviation or alerting an appropriate user. However, if the degree of deviation is significant, then backend system 220 may take an action such as quarantining or even blocking network connectivity to the PAS.

A configuration of comparison module 226 (e.g., evaluating an acceptable deviation range, evaluating a degree of deviation) can detect malware when a significant change in network traffic occurs, and either no change in context occurs (e.g., no new applications or version updates), or a change in context occurs that could indicate malware (e.g., network traffic occurs on a desktop computer of an enterprise in the middle of the night). Comparison module 226 may also be configured to not assume malware has infected a PAS when there is a gradual change in the pattern of use and the traffic patterns. A gradual change may be monitored to determine whether the change is a normal fluctuation of network traffic versus a change that is indicative of malware.

In another example implementation, PAS 230 may send, or otherwise provide, genetic program 224 and comparison module 226 to PAS 230. Thus, the genetic program and comparison module could run on PAS 230 to evaluate network traffic generated by PAS 230 and determine whether the actual network traffic of PAS 230 indicates a malware infection. GP creation module 222 may also reside on PAS 230, such that the entire backend system is integrated in a single potentially affected system.

Turning to FIG. 3, an interaction diagram illustrates potential network communications between PAS 230, backend system 220 and network 215 according to one example scenario in malware detection system 200. In this example scenario, when interactions begin at 302, the following description assumes that a genetic program has not yet been created by backend system 220 for PAS 230.

In at least one embodiment, one or more sets of operations correspond to the activities and interactions of FIG. 3. Backend system 220, or a portion thereof, may utilize at least one set of operations. Backend system 220 may comprise means, including, for example processor 228 of FIG. 2, for performing such operations. In at least one embodiment, GP creation module 222, genetic program 224, and comparison module 226 of backend system 220 may perform at least some of the operations. PAS 230, or a portion thereof, may utilize at least one other set of operations. PAS 230 may comprise means, including, for example processor 238 of FIG. 2, for performing such operations. In at least one embodiment, agent 232 and update module 234 of PAS 230 may perform at least some of the operations.

At 302, network traffic is generated by PAS 230, and is observed by backend system 220 as it traverses network 215 to a destination. The destination may be another computing device within network 215 or another computing device external to network 215. At 304, incoming network traffic to PAS 230, across network 215, is observed by backend system 220. The incoming network traffic may have originated from another computing device in network 215 or from another computing device external to network 215. In this example scenario, backend system 220 is configured to observe both incoming and outgoing network traffic associated with PAS 230. In other embodiments, however, backend system 220 may be configured to observe only outgoing traffic generated by PAS 230 or only incoming traffic received by PAS 230.

At 306, PAS 230 communicates context information to backend system 220. The context information may be sent continually, based on a given interval of time, while PAS 230 is online. In other embodiments, PAS 230 may communicate context information to backend system 220 based on new context information observed on PAS 230, based on certain types of context information observed on PAS 230, or based on a selected time interval for a heartbeat or handshake communication between PAS 230 and backend system 220. It will also be apparent that, while context information is illustrated as being communicated after network traffic observations in 302 and 304, these observations and communications may occur in any other order, or may occur simultaneously. Furthermore, more or less observations, and potentially more context information communications, may occur than indicated in FIG. 3.

At 308, backend system 220 creates a genetic program, based on the received context information and the observed network traffic, as previously described herein. Once the genetic program for PAS 230 is created, backend system 220 continues to observe outgoing network traffic at 310 and incoming network traffic at 312. In some embodiments, however, backend system 220 may be configured to observe only network traffic generated by PAS 230 (e.g., at 310) or only network traffic received by PAS (e.g., at 312). Additionally, PAS 230 continues to provide context information to backend system 220, as indicated at 314. Again, it will be apparent that, while context information is illustrated as being communicated after network traffic observations, these observations at 310 and 312, and the communications at 314, may occur in any other order, or may occur simultaneously. Additionally, more or less observations and communications may occur before flow continues in backend system 220.

When network traffic associated with PAS 230 has been observed by backend system 220, and current context information has been received by backend system 220, then at 316, the genetic program executes and creates a prediction of normal traffic for PAS 230. At 318, a backend system 220 determines whether the observed network traffic deviates from the predicted normal traffic. In at least one embodiment, this determination includes determining whether the observed network traffic from PAS 230 deviates from the predicted normal traffic for the currently observed context, beyond an acceptable deviation range. If the observed network traffic deviates beyond an acceptable deviation range, then backend system 220 can assume that PAS 230 has been compromised by malware. In this case, appropriate action may be taken at 320 based on policy. Appropriate action may include actions performed on PAS 230, as indicated at 320, such as disabling network connectivity, disabling network connectivity to PAS 230, etc. Other actions may include alerting a user (e.g., a security administrator), logging information related to the malware detection, etc.

In at least one other embodiment, any degree of deviation may be relevant to a likelihood of PAS 230 being compromised. In this embodiment, the determination at 318, of whether the observed network traffic deviates from the predicted normal traffic, includes determining whether there is any degree of deviation. The degree of deviation may be evaluated to determine which one or more actions should be taken, if any. For example, severe actions may be taken for significant deviations. Thus, when significant deviations are detected, at 320, PAS 230 may be quarantined or network connectivity may be disabled. For slight deviations, more moderate actions may be taken, such as alerting an appropriate user, logging the deviation detection, etc.

After an action is taken, backend system 220 may determine at 322, whether PAS 230 can still be monitored. If the action taken prevents the monitoring of PAS 230 (e.g., action disables network connectivity to PAS 230), then the flow may end. However, if a less severe action was taken (e.g., alerting, logging, etc.), then flow may continue at 308, where backend system 220 can update the genetic program, if needed, and can continue to monitor PAS 230.

If backend system 220 determines at 318, that the observed network traffic from PAS 230 does not deviate from the predicted normal traffic for the currently observed context (either because the deviation is not beyond an acceptable deviation range or because there is no degree of deviation or a minimal degree of deviation), then backend system 220 can assume that PAS 230 has a low likelihood of malware infection. In this case, flow can return to 308, where the genetic program is updated, if needed, and backend system 220 can continue to monitor PAS 230.

Essentially, the observed network traffic and the current context information can be evaluated to determine if normal fluctuations in the traffic patterns are occurring. As traffic patterns change over time, the genetic program can be updated to reflect the change in the normal traffic pattern predictions created by the genetic program.

Figure 4A:
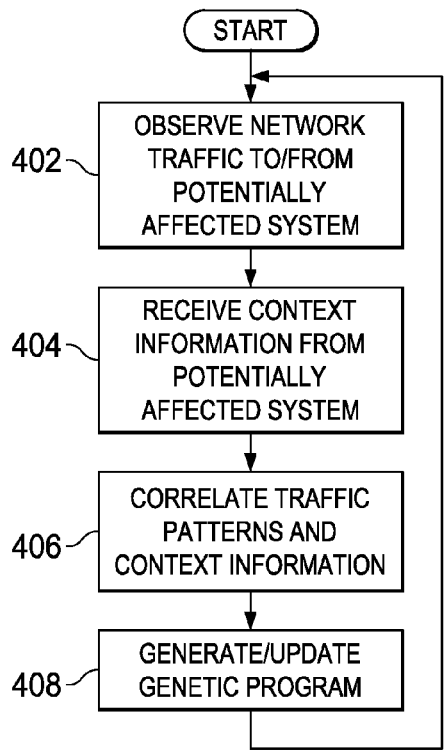
FIGS. 4A-4B are simplified flowcharts illustrating potential operations associated with at least one embodiment.

FIG. 4A is a simplified flowchart illustrating activities associated with detecting malware based on traffic pattern analysis according to an embodiment. A set of operations may correspond to the activities of FIG. 4A. In an embodiment, GP creation module 222 of backend system 220 may perform at least some of the operations.

At 402, a backend system observes network traffic associated with a potentially affected system (PAS). The network traffic may be outgoing network traffic generated by PAS, or incoming network traffic being received by PAS. At 404, the backend system may also receive, from the PAS, context information related to the PAS. Context information could include, for example, time, location, applications running, user presence, etc., all related to the PAS.

At 406, the backend system can correlate traffic patterns, based on the observed network traffic, with context information received from the PAS. If a genetic program has never been created for the PAS, then at 408, backend system can create a genetic program based on the correlations of network traffic and context information. If a genetic program already exists for the PAS, however, then at 408, backend system can evaluate whether the traffic patterns indicate a gradual change in the traffic patterns. If it is a gradual change (e.g., new traffic patterns resulting from a new version of an application, new pattern of use by a user, etc.), then backend system 220 can update the genetic program to provide predictions of normal traffic consistent with the changed traffic patterns.

Figure 4B:
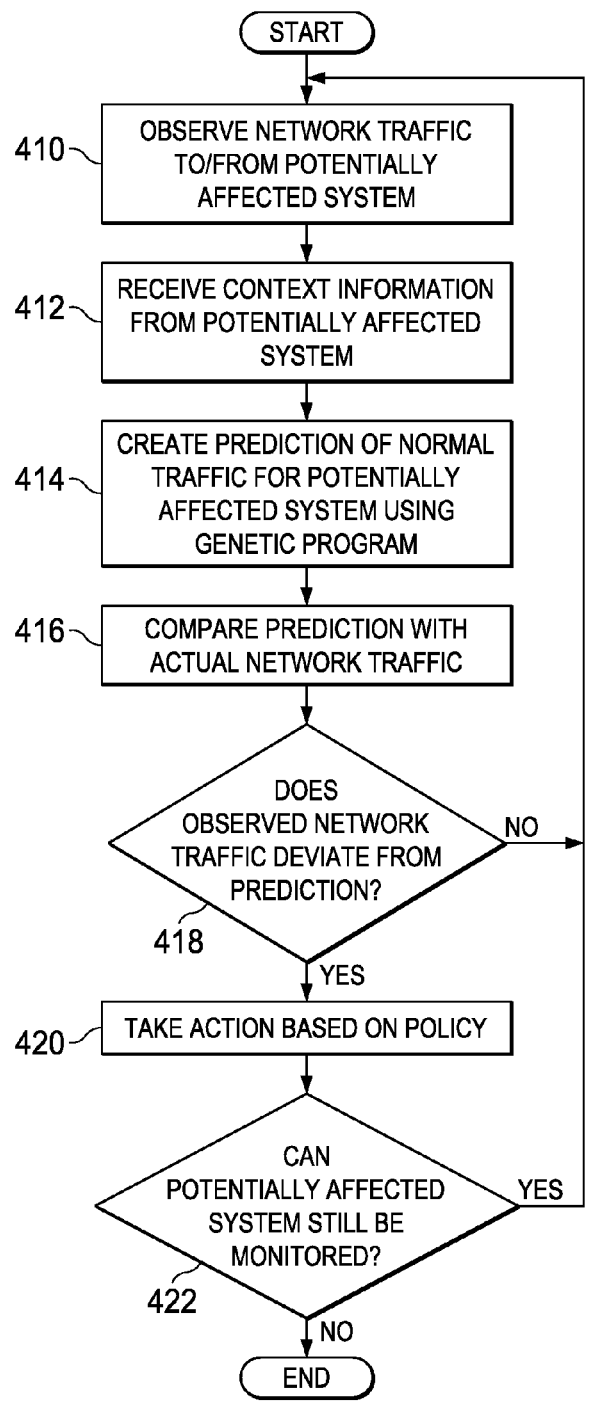

FIG. 4B is a simplified flowchart illustrating activities associated with detecting malware based on traffic pattern analysis according to an embodiment. A set of operations may correspond to the activities of FIG. 4B. In an embodiment, genetic program 224 and comparison module 226 of backend system 220 may perform at least some of the operations.

At 410, a backend system observes network traffic associated with a potentially affected system (PAS). The network traffic may be outgoing traffic generated by PAS, incoming traffic being received by PAS, or both. At 412, the backend system may also receive, from the PAS, context information related to the PAS. Context information could include, for example, time, location, applications running, user presence, etc., all related to the PAS. In an embodiment, the operations indicated at 410 and 412 in FIG. 4B may be the same operations performed at 402 and 404 of FIG. 4A, and may be performed a single time for the same network traffic and the same context information. However, information obtained from observing network traffic and for receiving context information may be used for both creating or updating the genetic program, and running the genetic program to compare predicted normal traffic to actual network traffic.

At 414, the backend system creates a prediction of normal traffic for the PAS. This prediction may be created by the genetic program. At 416, the backend system compares the prediction to the actual network traffic observed by the backend system. At 418, the backend system determines whether the observed network traffic deviates from the prediction of normal traffic. In at least one embodiment, the determination of 418 includes determining whether the observed network traffic from the PAS is within a range of acceptable deviation from the predicted normal traffic for the currently observed context. If the actual network traffic is not within the acceptable deviation range, then at 420, appropriate action may be taken based on policy (e.g., alert user, disable network connectivity of the PAS, etc.). However, if the network traffic is within the acceptable deviation range, then flow may return to 410, where the backend system may continue to monitor the PAS by observing network traffic, receiving context information from the PAS, and running the genetic program to determine whether the actual network traffic deviates from the predicted normal traffic.

In at least one other embodiment, the determination of 418 includes determining whether there is any degree of deviation. If no degree of deviation is detected, or if the degree of deviation is minimal, then flow may return to 410, where the backend system may continue to monitor the PAS, as previously described herein. If the observed network traffic is determined to deviate by some degree from the predicted normal traffic, however, then the backend system may select one or more actions to take based on the degree of deviation. For example, at 420, severe actions may be taken for significant deviations. More moderate actions may be taken at 420 for slight deviations.

After an action is taken at 420, the backend system may determine whether the PAS can still be monitored. If the action taken prevents the monitoring of the PAS (e.g., action disables network connectivity to the PAS), then the flow may end. However, if a less severe action was taken at 420 (e.g., alerting, logging, etc.), then flow may return to 410, where the backend system may continue to monitor the PAS, as previously described herein.

Figure 5A:
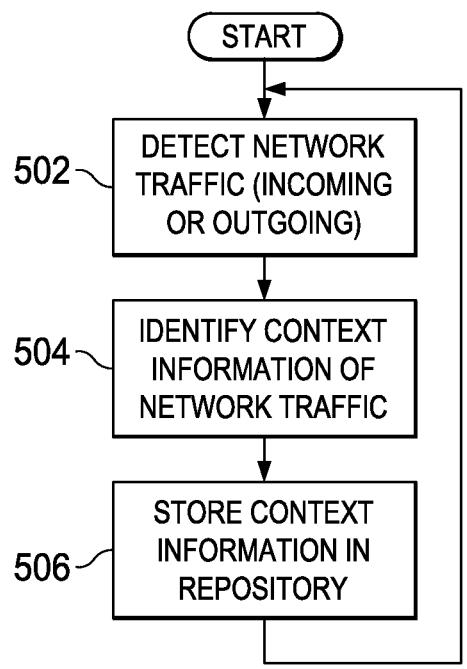
FIGS. 5A-5B are simplified flowcharts illustrating further potential operations associated with at least one embodiment.

Turning to FIG. 5A, FIG. 5A is a simplified flowchart illustrating activities associated with detecting malware based on traffic pattern analysis according to an embodiment. A set of operations may correspond to the activities of FIG. 5A. In an embodiment, agent 232 of PAS 230 may perform at least some of the operations.

At 502, a PAS can detect incoming or outgoing network traffic. At 504, PAS can identify context information related to the observed network traffic of the PAS. For example, time, location of the PAS, applications running on the PAS, user presence on the PAS, etc., may be included in the identified context information. At 506, PAS may store the context information in a context information repository, such as repository 233 of PAS 230. In other embodiments, the PAS may communicate the identified context information directly to a backend system. In this embodiment, PAS may not need a context information repository.

Figure 5B:
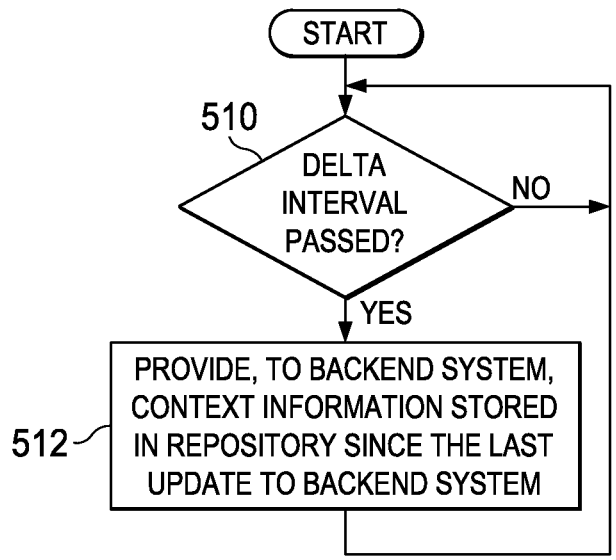

FIG. 5B is a simplified flowchart illustrating activities associated with detecting malware based on traffic pattern analysis according to an embodiment. A set of operations may correspond to the activities of FIG. 5B. In an embodiment, update module 234 of PAS 230 may perform at least some of the operations.

In at least one embodiment, the set of operations of FIG. 5B represent the heartbeat or handshake protocol that may be used by a PAS to communicate context information with a backend system. At 510, a determination is made as to whether a delta interval has passed. It the delta interval has not passed, then nothing is sent to the backend system, and the delta interval may be checked again. If the delta interval has passed, however, then at 512, the PAS can communicate to the backend system, context information from the context information repository. The context information sent to the backend system may include all information in the repository since the last heartbeat (i.e., since the last update to the backend system).

Figure 6:
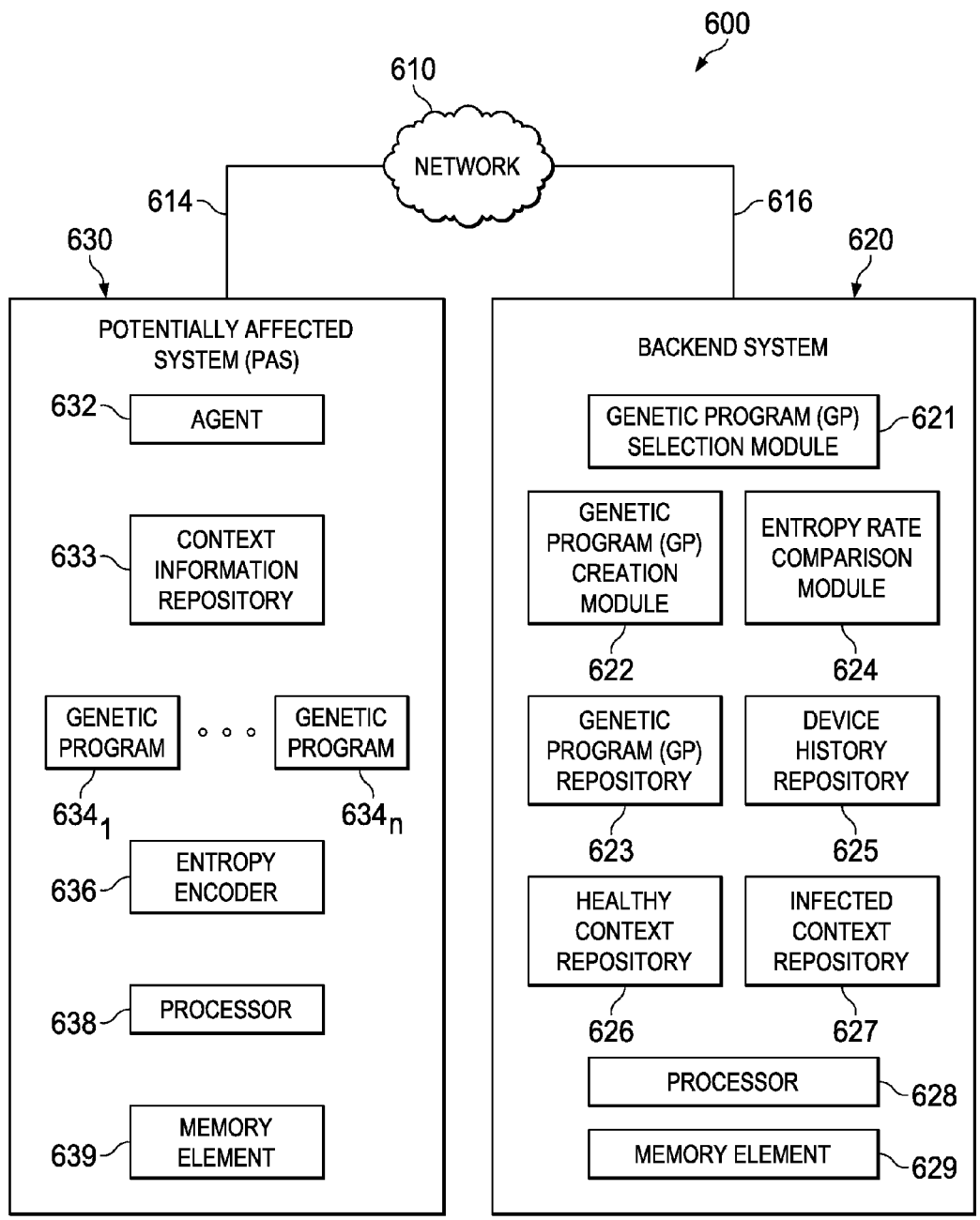
FIG. 6 is a simplified block diagram of another malware detection system, which includes entropy prediction according to at least one embodiment.

Turning to FIG. 6, a malware detection system using entropy prediction for distributed analysis can also resolve many of the issues associated with current malware detection techniques. A malware detection system using entropy prediction can monitor changes in behavior of a potentially affected system (PAS) to determine whether the PAS has been infected by malware. More specifically, a malware infection can be identified by examining entropy of output from a genetic program selected to run on the PAS. The entropy of output from a genetic program is referred to herein as 'entropy rate.' The selected genetic program operates on a set of one or more streams of context information and can perform operations on context elements in the streams. Each stream contains one or more context elements representing the context information. A genetic program running locally on the PAS, and communicating an entropy rate to a backend system, minimizes overhead needed to evaluate context information of the PAS to effectively predict whether the PAS has been infected by malware. Furthermore, embodiments of malware detection system 200 can detect a threat on a PAS without necessarily having any knowledge of the particular threat that is detected.

FIG. 6 illustrates a simplified example of a malware detection system 600 using entropy prediction for distributed analysis. For ease of illustration, a single potentially affected system (PAS) 630 and a backend system 620 are shown in communication via networks 614 and 616, which may connect to a public network 610, such as the Internet. Generally, malware detection system 600 can be implemented in any type or topology of networks. In an example implementation, backend system 620 could reside in a cloud network (e.g., network 616) and communicate with potentially affected systems in one or more other networks (e.g., network 614), such as a LAN, WLAN, VPN, VLAN, WAN, MAN, Intranet, Extranet, and any other appropriate architecture or system that facilitates communications in a network environment, or any suitable combination thereof, including wired and/or wireless communication. As previously described herein with reference to FIG. 1, these networks may be inclusive of any number of wire line and wireless technologies, including satellite, cellular, and other radio frequencies, for example. In other implementations, backend system 620 may be provided in a protected network with one or more potentially affected systems. These examples are intended to illustrate possible implementations and are not intended to be limiting. It will be apparent that the teachings provided herein may be applied to any number of different network configurations that enable communication between PAS 630 and backend system 620.

Possible communication messaging protocols and interfaces may be the same or similar to those described with reference to malware detection system 200 of FIG. 2. In particular, in malware detection system 600, network traffic that includes packets can be sent and received according to any suitable communication messaging protocols (e.g., TCP/IP, UDP/IP, etc.).

Data used by PAS 630 and backend system 620 may be stored in any suitable storage location. A context information repository 633 can be internal to PAS 630 or external (entirely or in part). Similarly, any one or more of the repositories of backend system 620, such as a genetic program (GP) program repository 623, a device history repository 625, a healthy context repository 626, and an infected context repository 627, can be internal to backend system 620 or external (entirely or in part). Internal storage could include any internal memory of PAS 630 or backend system 620, such as static storage, random access memory (RAM), or cache, for example. External storage could include a network storage technique such as network attached storage (NAS) or storage area network (SAN), or the internal memory of another network element.

In at least one embodiment, as shown in FIG. 6, PAS 630 may include an agent 632, context information repository 633, and an entropy encoder 636. PAS 630 may also include, at any given time, one or more genetic programs $634_1$ through $634_n$. Backend system 620 may include a genetic program (GP) selection module 621, a genetic program (GP) creation module 622, GP repository 623, an entropy rate comparison module 624, device history repository 625, healthy context repository 626, and infected context repository 627. PAS 630 and backend system 620 may each include at least one processor 638 and 628, respectively, and at least one memory element 639, and 629, respectively.

In an embodiment, agent 632 is adapted to observe the context on PAS 630. This observation may be performed continually in at least one embodiment. Agent 632 may store one or more streams of context information in context information repository 633. The context of a PAS is generally information related to the functioning of the PAS and can include, but is not limited to time, location, type of applications, applications currently executing, user presence, user identification, network connections, etc. More specific context information may also be observed, such as an application starting up, user strokes on a keyboard, an application doing things that require special permission (e.g., accessing an address book, operating system permissions that an application is using, operating system permissions that were denied to an application, etc.), and the like. Also, as previously described with reference to FIG. 2, the context observed for a particular PAS may depend upon the type of the PAS.

The context information can be observed based on, or in response to, different events. Observed context information that is associated with an event can be formed into a stream of context information, and each stream can include one or more context elements that represent the context information. Accordingly, each stream could correspond to a different event. Types of events could include, but are not limited to networking events, keyboard events, an application starting up, etc. One or more streams of context information corresponding to different events of a PAS can be fed into a genetic program. The genetic program may then produce an output stream.

PAS 630 may also be configured to communicate with backend system 620 via agent 632. In at least one embodiment, backend system 620 is provisioned in a cloud network, and may communicate with the one or more PAS's being monitored via a public network such as network 610. In an example implementation, backend system 620 can be configured to monitor multiple PAS's in the same or different protected networks.

Communication between agent 632 and backend system 620 may be configured to have an ongoing heartbeat or handshake to detect modifications to or disablement of agent 632 on PAS 630. The heartbeat or handshake communications protocol, as previously described herein with reference to FIG. 2, could provide for updates at given intervals of time or updates based on particular events detected on PAS 630.

In at least one embodiment, PAS 630 receives one or more genetic programs $634_{1-n}$ from backend 620. PAS 630 may also receive, or be configured with, one or more time-spans associated with the genetic programs. A time-span for a genetic program may be selected by backend 620 and communicated to PAS 630, in at least one embodiment. The time-span can indicate an amount of time for PAS 630 to observe context information on PAS 630 for the associated genetic program. Streams of context information observed during the time-span can be processed (e.g., manipulated) by the genetic program associated with the time-span. In at least one embodiment, the associated genetic program may be configured to run during the time-span, and to receive streams of context information as they are generated. In at least one other embodiment, the associated genetic program may be configured to run after the context information has been observed during the time-span and the streams of context information for that time-span have been generated.

In at least one embodiment, the genetic program manipulates one or more streams of context information, for example, by performing various operations on one or more context elements in the streams. Such operations could include, but are not limited to deleting or retaining context elements based on certain conditions, sorting context elements, adding up context elements, encrypting context elements with other context elements, etc. In at least one embodiment, the operations performed on the one or more streams of context information can be configured to produce an output stream, which can be a single stream of manipulated context information.

Operations of a genetic program that are performed on streams of context information, can enable the genetic program to target particular activities that may be affected by certain types of malware. For example, a genetic program may perform operations on the streams to filter out all events that do not use an email port on PAS 630, in order to obtain an output stream that can be evaluated for email malware. In another example, a genetic program may perform operations to keep only events that request access to an address book on the PAS in order to obtain an output stream that can be evaluated for spyware. Thus, at least some genetic programs may be configured to pinpoint specific types of behavior on the PAS by manipulating the streams of context information.

Operations performed on streams of context information also help obfuscate the malware detection scheme from any malware that may have infected a PAS. The multitude of possible operations that may be performed on context elements, in addition to the multitude of possible genetic programs that may be configured to use different operations or combinations of operations on context elements, make it extremely difficult to predict what a currently selected and executing genetic program on a PAS is doing. Therefore, if malware infects a PAS, its efforts to evade and/or thwart the malware detection scheme may be ineffective.

In at least one embodiment, an output stream of a genetic program can be fed into an entropy encoder, such as entropy encoder 636 on PAS 630. Entropy encoder 636, also referred to as 'data compressor,' can apply a data compression scheme to the output stream in at least one embodiment. Some entropy encoding techniques may involve replacing fixed-length symbols (e.g., one or more characters) in an output stream with a predetermined variable length code. Generally, the encoded data uses fewer bits than the original data. When the data has been compressed, entropy encoder 636 can generate the relative entropy (or entropy rate) of the compressed data. In one example, the entropy rate can be a compression ratio, defined as the ratio between the compressed data size and the uncompressed data size. In accordance with at least one embodiment, the particular entropy encoding technique that is used in malware detection system 600 may be based on particular needs and implementation details of the system.

PAS 630 can communicate the entropy rate to backend system 620. Typically, this communication occurs after the specified time-span associated with the genetic program has expired. In at least one embodiment, at any given time, more than one genetic program may be active on PAS 630. More than one genetic program may be active to ensure that the context of PAS 630 is continually observed and that all of the observed context information is processed by at least one genetic program.

In an example configuration of PAS 630, agent 632 manages the observation of context information and execution of genetic programs. For example, agent 632 may receive the genetic program and an associated time-span from backend system 620, observe context information during the associated time-span, execute the genetic program, and provide the entropy rate to backend system 620.

In backend system 620, GP creation module 622 may be configured to continually create new and/or update existing genetic programs, such as genetic programs $634_{1-n}$, and to store the genetic programs in GP repository 623. Genetic program creation can be achieved by evaluating genetic programs based on previously recorded context streams from both healthy systems (i.e., free of malware) and infected systems (i.e., containing malware). The genetic programs may be selected based on their ability to generate the largest difference in entropy rate numbers between a healthy system and an infected system.

Backend system 620 may include, have network access to, or be provided with healthy context repository 626 and infected context repository 627, which can contain previously recorded context streams. Infected context repository 627 may contain multiple, separate pools of context streams for infected systems, for different classes and possibly even instances of malware. Similarly, healthy context repository 626 may contain separate context streams for different device types of healthy systems (e.g., mobile device, server, laptop, etc.). Moreover, these repositories may be updated at given intervals of time, or when particular events occur (e.g., new malware becomes known).

As new genetic programs are created, a library of genetic programs can be built and stored, for example, in GP repository 623. Based on the various types of streams available in infected context repository 627, GP creation module 622 can create genetic programs for particular types of malware, as well as genetic programs for detecting malware generally. Consequently, the library of genetic programs, collectively, may enable detection of a multitude of different types of known and unknown malware.

In an embodiment, entropy rate comparison module 624 may use information from device history repository 625 to evaluate entropy rates provided by a PAS, to determine whether malware has infected the PAS. For example, entropy rate comparison module 624 may evaluate an entropy rate received from PAS 630 after a particular genetic program has executed on PAS 630 and its associated time-span has expired. Entropy rate comparison module 624 may compare the received entropy rate to an expected average entropy rate. In at least one embodiment, the average entropy rate can be determined by taking an average of reported entropy rates of one or more computing devices, where the entropy rates are based, at least in part, on the particular genetic program. To generate the entropy rates to be averaged, the genetic program could run on the computing devices or could run on another system (e.g., backend system 620) and receive input from the computing devices. Input from a computing device may be in the form of one or more streams of context information. In some embodiments, the one or more computing devices could be, for example, all PAS's in an enterprise, all PAS's in a particular network, all PAS's of some predefined set of PAS's, etc. In other embodiments, the one or more computing devices could be a known set of healthy systems. In yet other embodiments, the average entropy rate could be determined using the output from the genetic program when one or more streams of previously recorded context information are used as input (e.g., from healthy context repository 626). Further, an average entropy rate can be determined for each genetic program. The average entropy rate may also be device specific. By way of example, backend system 620 may have an average entropy rate for a particular genetic program running on an iPhone mobile phone, and a different average entropy rate for the same or similar genetic program running on an Android mobile phone.

If PAS 630 is infected, its entropy rate is likely to be numerically spaced away from the average entropy rate in one direction. For example, the entropy rate of an infected system may have one of a larger or smaller ratio than the average entropy rate. As the entropy rate of PAS 630 tends to move farther away from the average entropy rate, in the direction of an entropy rate of an infected system, evidence (in a Bayesian statistical sense) of a malware infection on PAS 630 increases. Conversely, if the entropy rate of PAS 630 is equivalent to the average entropy rate or is on the opposite side of the average from an entropy rate that indicates malware, this can be evidence tending to indicate PAS 630 is not infected with malware.

In an embodiment, backend system 620, rather than PAS 630, knows which direction of movement by the entropy rate, relative to the average entropy rate, tends to increase the likelihood of infection. More particularly, PAS 630 does not know what a healthy entropy rate is for a given genetic program. Consequently, even sophisticated malware will be unable to predict how to modify the context information on the PAS, or the generated entropy rate itself, to evade detection by entropy rate comparison module 624. For example, some malware may be configured to report a false entropy rate of its choice, which could be achieved by generating a random number, or by manipulating the actual measured entropy rate. However, the malware does not know which direction to manipulate the entropy rate. Thus, a few incorrect manipulations may quickly cause the device to be flagged as infected even faster (or even more strongly).

In at least one embodiment, device history repository 625 may be used in backend system 620 to record results of entropy rate comparisons for one or more potentially affected systems. In at least one embodiment, a result of an entropy rate comparison can include an indicator of whether the entropy rate correlates to an entropy rate of a system containing malware (i.e., infected system), or whether the entropy rate correlates to an entropy rate of a system that does not contain malware (i.e., healthy system). In this Specification, a 'system containing malware' and a 'system that does not contain malware' are intended to comprise computing devices. In some embodiments, the indicator can be some form of data and may be based on a relative scale having a range of values (e.g., entropy rate indicates a very high/average/slight correlation to entropy rates of infected systems, entropy rate indicates a very high/average/slight correlation to entropy rates of healthy systems, etc.).

Results from entropy rate comparisons for a particular PAS, such as PAS 630, can provide a statistical history of the PAS that can be evaluated in the aggregate to determine a probability of whether the PAS is infected with malware. A single indicator of infection from a comparison result may not be sufficient to conclusively determine the PAS contains malware and/or to take remedial actions. A single indicator of infection could simply be statistical noise. However, a series of indicators of infection can provide more conclusive evidence the PAS is infected, and therefore, may validate appropriate actions based on policies (e.g., send an alert to an administrator or other user, disable network connectivity of identified PAS, quarantine identified PAS, etc.). In at least one embodiment, each time an indicator of infection is produced from a comparison result of a particular PAS, previous indicators (including indicators of a healthy system and/or indicators of an infected system), from entropy rate comparison results for that PAS, can be obtained from device history repository 625. The new indicator and the previous indicators can be aggregated and evaluated to determine a probability of infection for that PAS. Some entropy rate comparison results may provide stronger evidence of infection or stronger evidence of no infection. Thus, the determination of the probability of infection can be based on the degree to which the result indicates that infection is likely, or not likely. In addition, each time a new (or updated) probability of infection is determined, it may be stored (e.g., in device history repository 625), for comparison to future probability determinations.

In at least one embodiment, determining whether an action should be taken is based on a predetermined probability threshold. For example, once the probability reaches or passes the predetermined probability threshold, backend system 620 can take appropriate action. The probability threshold may be established relative to the context of its application. For example, a low probability threshold may be set for a known application that accesses highly confidential data. Conversely, a more general or benign activity, such as web browsing, may have a higher probability threshold.

In at least one other embodiment, determining whether an action should be taken is based on a determination of whether the probability of infection has increased, relative to a previous or expected probability of infection. As the probability of infection increases over time, one or more actions from a predefined set of actions may be taken. In at least some embodiments, one or more actions may be selected based on the amount of increase of the new probability over a previous or expected probability.

GP selection module 621 of backend system 620 may select, based on predefined criteria, which genetic programs to send to which potentially affected systems. GP selection module 621 may also select time-spans to be associated with those genetic programs. In some embodiments, GP selection module 621 may be configured to automatically make such selections and provide the selected genetic programs and time-spans to potentially affected systems. In other embodiments, however, one or more of these selections may be made by a user via a user interface. Additionally, the criteria used to make the selections automatically may be made by a user via a user interface in at least one embodiment.

In at least one embodiment, the selection of a genetic program to run on a PAS may depend, at least in part, on the device history of the PAS. For example, if a PAS has not been previously monitored, or has had consistently good entropy rate comparison results, then a more general genetic program may be selected and sent to the PAS for a specified time-span.

However, if there is some evidence (e.g., soft evidence such as one indicator of infection from an entropy rate comparison result) indicating a certain type of infection, then backend system 620 may select one or more genetic programs for the PAS that are known to be better at differentiating between specific classes of malware.

In an example implementation, GP selection module 621 may randomly select genetic programs to run on one or more potentially affected systems to be monitored. In another example implementation, GP selection module 621 may initially select a genetic program that provides general or broad detection logic for one or more potentially affected systems to be monitored. If a genetic program running on one of the PAS's provides an entropy rate that indicates evidence of a possible malware infection, and/or if other information causes suspicion of a possible malware infection (e.g., malware was detected in other PAS's in the network), then GP selection module 621 may send a more targeted genetic program to identify specific malware on the PAS. Because the PAS does not know which genetic program it will receive from the library of genetic programs (e.g., GP repository 623), malware on the PAS will not be able to predict the average entropy rate expected by backend system 620. Accordingly, malware detection system 600 enables detection of malware through deviating behavior of a potentially affected system, without knowledge of the actual malware itself.

In some embodiments, genetic programs may include externally observable information, for example, to help avoid replay malware attacks. In these embodiments, backend system 620 can calculate the exact (or very close to exact) entropy rate that should have been reported. For example, backend system 620 may send a large data message to PAS 630 that causes certain response network traffic. With constant external data, the responses from PAS 630 should be reasonably constant. Therefore, any deviation from the expected entropy rate, for a healthy system, is very strong evidence of manipulation and thus, malware infection.

Figure 7:
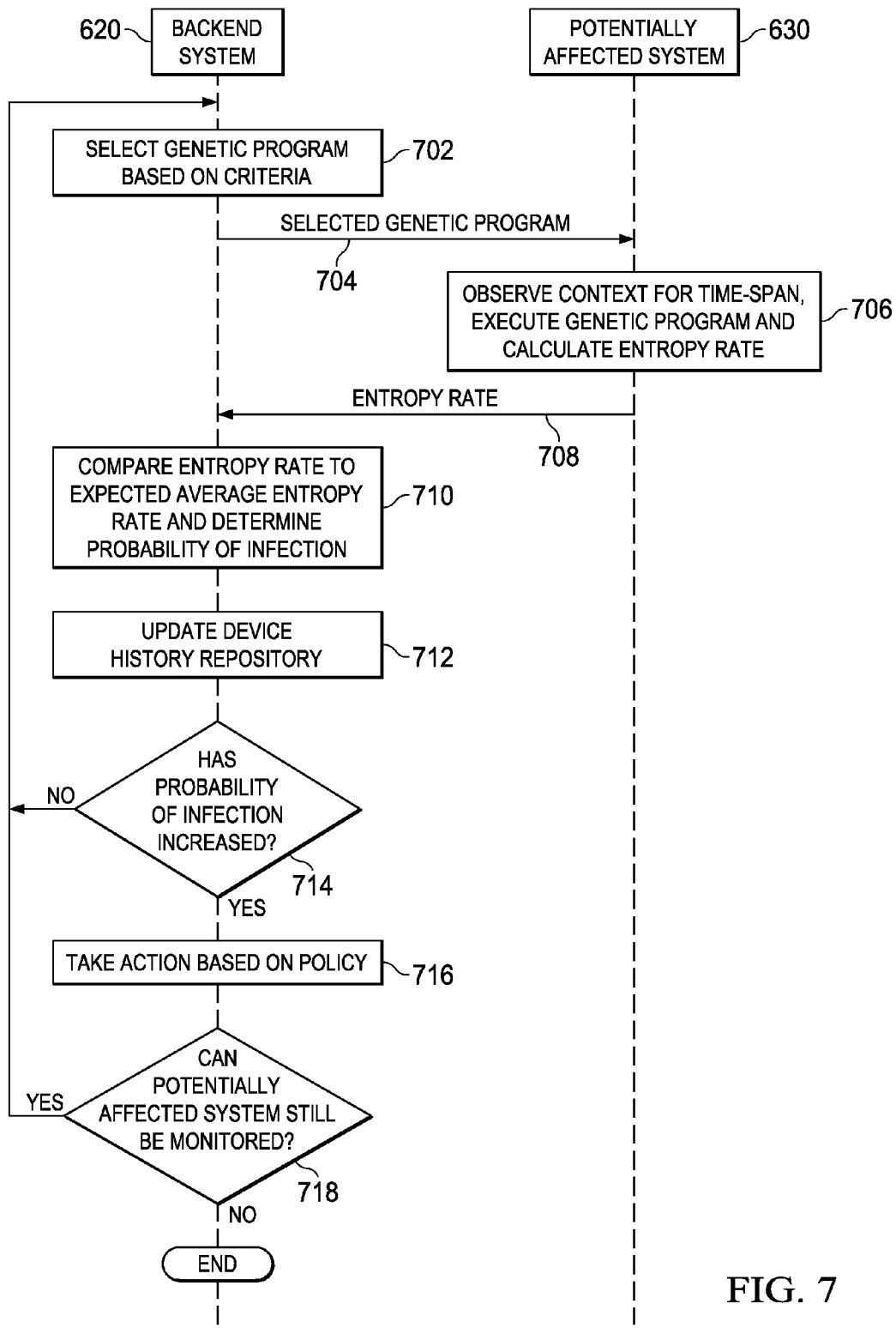
FIG. 7 is a simplified interaction diagram illustrating potential operations of a malware detection system with entropy prediction according to at least one embodiment.

Turning to FIG. 7, an interaction diagram illustrates potential network communications between backend system 620 and PAS 630, according to one example scenario in malware detection system 600. In this example scenario, when interactions begin at 702, the following description assumes that one or more genetic programs have already been created and stored in GP repository 623.

In at least one embodiment, one or more sets of operations correspond to the activities and interactions of FIG. 7. Backend system 620, or a portion thereof, may utilize at least one set of operations. Backend system 620 may comprise means, including, for example processor 628 of FIG. 6, for performing such operations. In at least one embodiment, GP selection module 621 and entropy rate comparison module 624 may perform at least some of the operations. PAS 630, or a portion thereof, may utilize at least one other set of operations. PAS 630 may comprise means, including, for example processor 638 of FIG. 6, for performing such operations. In at least one embodiment, agent 632, one of genetic programs 634$_{1-n}$, and entropy encoder 636 may perform at least some of the operations.

At 702, backend system 620 selects a genetic program to be executed by PAS 630. Backend system 620 may also select a time-span for the genetic program. In various embodiments, the genetic program may be selected based on predefined criteria or may be selected, at least in part, by a user. Predefined criteria used to select a genetic program for a PAS could include, for example, selections based on the history of the PAS, selections based on indicators of malware on the PAS, selections based on indicators of malware in other PAS's in the same network, selections based on a determination that the probability of infection has increased, etc.

At 704, backend system 620 provides the selected genetic program to PAS 630. In an embodiment, backend system 620 may also provide the time-span associated with the genetic program to PAS 630. In other embodiments, this time-span may be configured in agent 632. The configured time-span could be used for all genetic programs that run on PAS 630 or as a default for genetic programs that are received without an associated time-span. In at least one embodiment, at 706, agent 632 observes context of PAS 630 for the specified time-span and executes the genetic program. When the specified time-span expires, the output of the genetic program may be fed into entropy encoder 636, which produces a resulting entropy rate.

At 708, PAS 630 communicates the calculated entropy rate to backend system 620. At 710, backend system 620 may compare the entropy rate received from PAS 630 to an expected average entropy rate. The comparison can result in evidence in the form of an indicator that PAS 630 is either infected with malware, or not infected with malware. The evidence from the comparison can be evaluated based on the statistical history of PAS 630, which may be stored in device history repository 625. Based on this evaluation, backend system 620 can determine a probability that PAS 630 is infected with malware. At 712, device history repository 625 can be updated with information related to the probability that PAS 630 is infected with malware (e.g., determined probability value, indicator of a healthy system or indicator of an infected system, etc.).

At 714, backend system 620 determines whether the probability that PAS 630 is infected with malware has increased. In at least one embodiment, this determination includes determining whether the probability has reached or exceeded a predetermined threshold. If a predetermined threshold has been reached or exceeded, then at 716, backend system 620 may take an action based on policy (e.g., alert a user, quarantine the device, disable network connectivity to the device, etc.). Furthermore, this predetermined threshold may not be static. For example, the threshold could be relative to the context (e.g., whether an application is known, whether an application involves confidential data, whether the probability previously increased even though it did not reach the predetermined threshold, etc.). If a predetermined threshold has not been reached or exceeded, as determined at 716, then flow can return to 702, where backend system 620 can select another genetic program based on predefined criteria, and can continue to monitor PAS 630.

In at least one other embodiment, the determination at 714 includes determining whether the probability has increased relative to an expected probability or relative to a previously determined probability. If the probability has not increased, then flow may return to 702, where backend system 620 can select another genetic program based on predefined criteria, and can continue to monitor PAS 630. If the probability has increased, however, then at 716, one or more actions from a predefined set of actions may be taken based on policy (e.g., alerting a user, logging the information, quarantining the device, etc.). In one example, the one or more actions taken may include selecting additional, potentially more targeted, genetic programs for PAS 630. In at least one embodiment, the actions in the predefined set of actions may increase in severity as the probability increases over time.

For illustration purposes, consider an example scenario. In this example scenario, when a probability initially increases for a PAS, then the action taken at 716 may include logging the increased probability in a logging database or other reporting mechanism. When the probability of infection increases again, then the action taken may include sending an alert to an appropriate user (e.g., IT security administrator). When the probability of infection increases yet again, then the action taken may include blocking access from the PAS to certain security-sensitive servers in the network (e.g., financial servers, engineering servers, legal servers, etc.). In an embodiment, actions may continue to be taken each time the probability of infection increases.

After an action is taken at 716, backend system 620 may determine whether PAS 630 can still be monitored. If the action taken prevents the monitoring of PAS 630 (e.g., action disables network connectivity to PAS 630), then the flow may end. However, if a less severe action was taken at 716 (e.g., alerting, logging, etc.), then flow may continue at 702, where backend system 620 can select another genetic program based on predefined criteria, and can continue to monitor PAS 630.

Figure 8A:
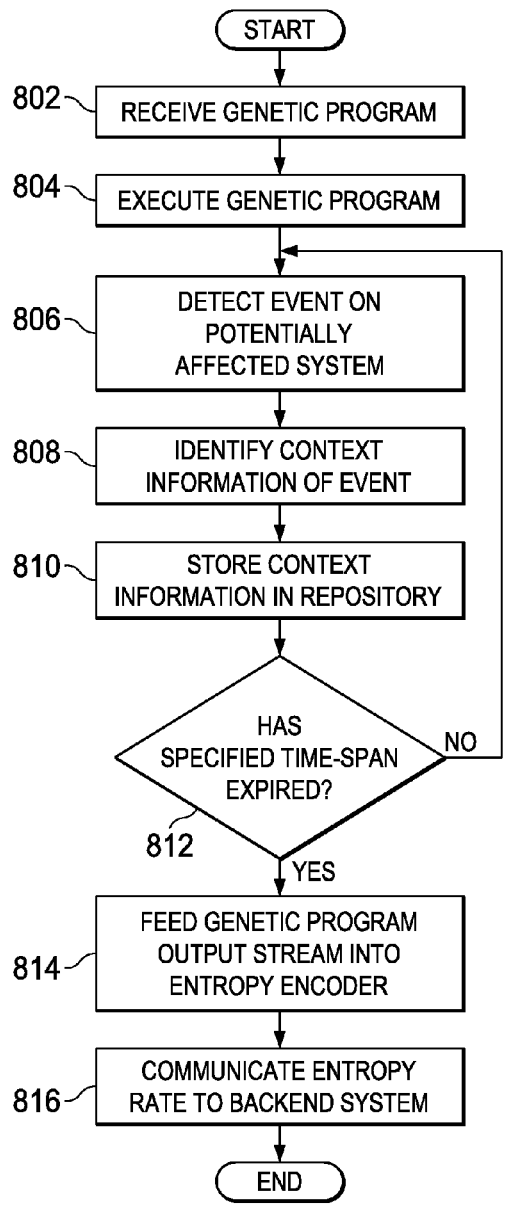
FIGS. 8A-8B are simplified flowcharts illustrating potential operations associated with at least one embodiment.
Figure 8B:
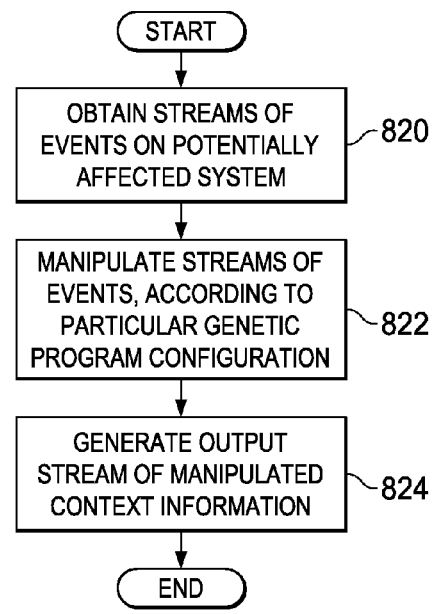

FIGS. 8A-8B are simplified flowcharts illustrating activities associated with detecting malware based on entropy prediction according to an embodiment. FIGS. 8A and 8B illustrate activities that may be performed by various components of a PAS, such as PAS 630. A set of operations may correspond to the activities of FIG. 8A. In an embodiment, agent 632 and entropy encoder 636 of PAS 630 may perform at least some of the operations.

At 802, a PAS receives a genetic program. At 804, the PAS may execute the genetic program for a specified time-span associated with the genetic program. In one example, the specified time-span can be received with the genetic program. In another example, the PAS can have a default time-span that can be used for a genetic program that does not have an associated time-span.

At 806 through 810, the PAS is observing context information of events occurring on the PAS. These observing activities may occur on PAS continually regardless of whether the genetic program is running. However, 806 through 810 represent the observing activities that may occur during the specified time-span associated with genetic program. At 806, the PAS detects an event. An event could be, for example, network communications, applications starting, keyboard strokes, etc. The PAS may then identify context information of the event. At 810, the context information can be stored, for example, in context information repository 633, in cache, etc. The context information for an event can be combined to produce a stream of context information. In an embodiment, streams of context information can be fed to the genetic program during the time-span. The genetic program can manipulate the streams based on the genetic program's particular logic.

At 812, to the PAS determines whether the specified time-span has expired. If the specified time-span has not expired, then flow continues at 806 through 810 for the PAS to continue to observe its context information. If, however, the specified time-span has expired, then at 814, the genetic program may end and an output stream from the genetic program can be fed into an entropy encoder. The entropy encoder can produce a compression ratio, or entropy rate, from the output stream. At 816, the PAS provides the entropy rate to the backend system.

In another embodiment, the genetic program may not be executed until after the associated time-span has expired. During the time-span, the generated streams of context information may be stored, for example, in context information repository 633 or in cache. Once the time-span expires, the associated genetic program may be executed and process all of the streams of context information that were generated during the time-span. The genetic program can generate an output stream that can be fed into an entropy encoder to produce an entropy rate. The entropy rate can be provided to the backend system.

Another genetic program and its associated time-span may be used to continue monitoring the PAS once the time-span associated with the previously selected genetic program expires. The time-spans may overlap in at least some embodiments.

FIG. 8B is a simplified flowchart illustrating activities associated with detecting malware based on entropy prediction according to an embodiment. A set of operations may correspond to the activities of FIG. 8B. In an embodiment, a genetic program, such as any of genetic programs $634_{1-n}$ of PAS 630, may perform at least some of the operations.

At 820, a genetic program executing on a PAS obtains one or more streams of context information related to events on the PAS. At 822, the genetic program may manipulate the streams of context information according to the particular logic of the genetic program. At 824, the genetic program can generate an output stream of manipulated context information.

In some embodiments, the streams of context information may be fed to the genetic program continuously during the time-span while the genetic program is executing. The genetic program can manipulate the streams as they are received, according to logic of the genetic program. In other embodiments, the streams may be stored (e.g., in context information repository 633 or cache) and the genetic program may obtain the streams once the time-span has expired. In this embodiment, the genetic program can manipulate the streams at one time, according to logic of the genetic program.

Figure 10:
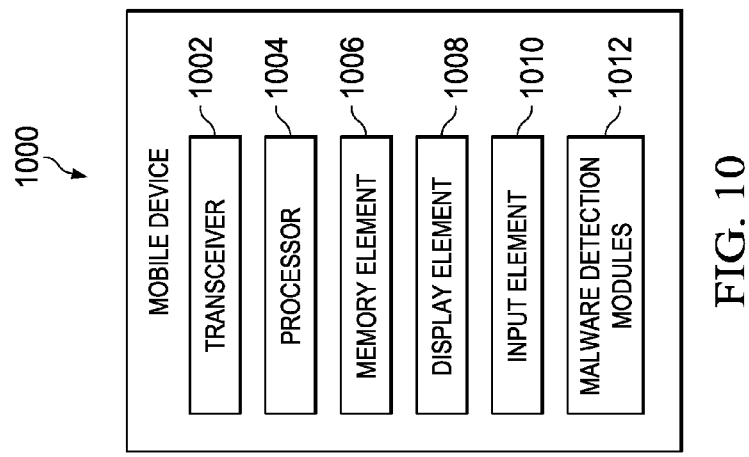
FIG. 10 is a block diagram of an example mobile device according to an embodiment.
Figure 9:
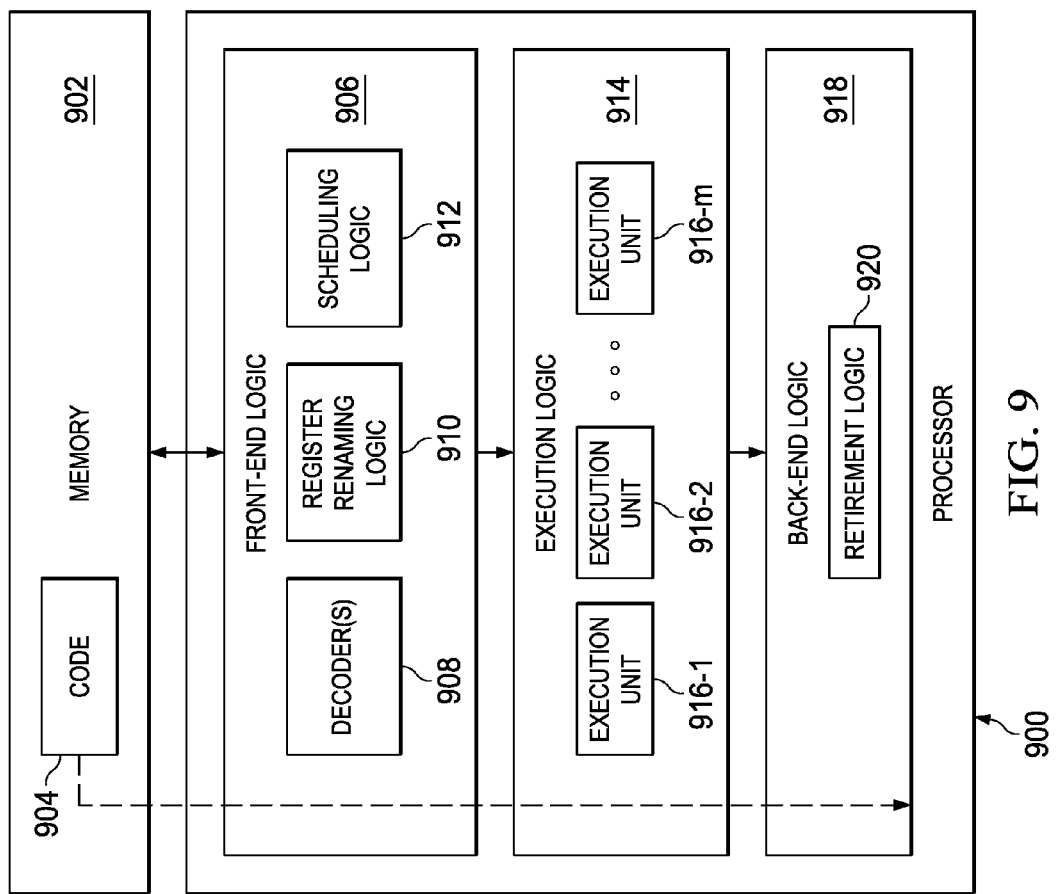
FIG. 9 is a block diagram of a memory coupled to an example processor according to an embodiment.

FIGS. 9-11 are block diagrams of exemplary computer architectures that may be used in accordance with embodiments disclosed herein. Other computer architecture designs known in the art for processors, mobile devices, and computing devices, and network elements may also be used. Generally, suitable computer architectures for embodiments disclosed herein can include, but are not limited to, configurations illustrated in FIGS. 9-11.

FIG. 9 is an example illustration of a processor according to an embodiment. Processor 900 is one example embodiment of processors 228, 238, 628, and 638 of backend system 220, PAS 230, backend system 620, and PAS 630, respectively.

Processor 900 may be any type of processor, such as a microprocessor, an embedded processor, a digital signal processor (DSP), a network processor, a multi-core processor, a single core processor, or other device to execute code. Although only one processor 900 is illustrated in FIG. 9, a processing element may alternatively include more than one of processor 900 illustrated in FIG. 9. Processor 900 may be a single-threaded core or, for at least one embodiment, the processor 900 may be multi-threaded in that it may include more than one hardware thread context (or "logical processor") per core.

FIG. 9 also illustrates a memory 902 coupled to processor 900 in accordance with an embodiment. Memory 902 is one example embodiment of memory elements 229, 239, 629, and 639 of backend system 220, PAS 230, backend system 620, and PAS 630, respectively. Memory 902 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 900 can execute any type of instructions associated with the distributed malware detection operations detailed herein. Generally, processor 900 can transform an element or an article (e.g., data) from one state or thing to another state or thing.

Code 904, which may be one or more instructions to be executed by processor 900, may be stored in memory 902. Code 904 can include instructions of various modules (e.g., GP creation module 222, genetic program 224, comparison module 226, agent 232, update module 234, GP selection module 621, GP creation module 622, entropy rate comparison module 624, agent 632, genetic programs $634_{1-n}$, entropy encoder 636) that may be stored in software, hardware, firmware, or any suitable combination thereof, or in any other internal or external component, device, element, or object where appropriate and based on particular needs. In one example, processor 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor 900 can also include execution logic 914 having a set of execution units $916_1$ through $916_m$. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor 900 allows out of order execution but requires in order retirement of instructions. Retirement logic 920 may take a variety of known forms (e.g., re-order buffers or the like). In this manner, processor 900 is transformed during execution of code 904, at least in terms of the output generated by the decoder, hardware registers and tables utilized by register renaming logic 910, and any registers (not shown) modified by execution logic 914.

Although not shown in FIG. 9, a processing element may include other elements on a chip with processor 900. For example, a processing element may include memory control logic along with processor 900. The processing element may include I/O control logic and/or may include I/O control logic integrated with memory control logic. The processing element may also include one or more caches. In some embodiments, non-volatile memory (such as flash memory or fuses) may also be included on the chip with processor 900.

Referring now to FIG. 10, a block diagram is illustrated of an example mobile device 1000. Mobile device 1000 is one example of a mobile device, such as an endpoint device 150 of network environment 100. A potentially affected system, such as PAS 230 and PAS 630, may be configured as a mobile device. In an embodiment, mobile device 1000 operates as a transmitter and a receiver of wireless communications signals. Specifically, in one example, mobile device 1000 may be capable of both transmitting and receiving cellular network voice and data mobile services. Mobile services include such functionality as full Internet access, downloadable and streaming video content, as well as voice telephone communications.

Mobile device 1000 may correspond to a conventional wireless or cellular portable telephone, such as a handset that is capable of receiving "3G", or "third generation" cellular services. In another example, mobile device 1000 may be capable of transmitting and receiving "4G" mobile services as well, or any other mobile service.

Examples of devices that can correspond to mobile device 1000 include cellular telephone handsets, smartphones, and tablets such as those capable of Internet access, email, and instant messaging communications, and portable video receiving and display devices, along with the capability of supporting telephone services. It is contemplated that those skilled in the art having reference to this specification will readily comprehend the nature of modern smartphones, tablets, and telephone handset devices and systems suitable for implementation of the different aspects of this disclosure as described herein. As such, the architecture of mobile device 1000 illustrated in FIG. 10 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 1000 includes a transceiver 1002, which is connected to and in communication with an antenna. Transceiver 1002 may be a radio frequency transceiver. Also, wireless signals may be transmitted and received via transceiver 1002. Transceiver 1002 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 1002 is connected to a processor 1004, which may perform the bulk of the digital signal processing of signals to be communicated and signals received, at the baseband frequency. Processor 1004 can provide a graphics interface to a display element 1008, for the display of text, graphics, and video to a user. Processor 1004 may include an embodiment as shown and described with reference to processor 900 of FIG. 9.

In an aspect of this disclosure, processor 1004 may be a processor that can execute any type of instructions to achieve distributed malware detection operations on mobile devices, as detailed herein. Processor 1004 may also be coupled to a memory element 1006 for storing information to be used in achieving the distributed malware detection operations. In an example embodiment, mobile device 1000 may be designed with a system-on-a-chip (SoC) architecture, which integrates many or all components of the mobile device into a single chip, in at least some embodiments.

In an aspect of this disclosure, memory element 1006 of mobile device 1000 may also include malware detection modules 1012. Malware detection modules 1012 can include modules and data used in embodiments of malware detection systems described herein. For example, when mobile device 1000 is implemented as a potentially affected system (e.g., PAS 230) in malware detection system 200, malware detection modules 1012 can include, but are not limited to GP creation module 222, genetic program 224, comparison module 226, and context information repository. In another example, when mobile device 1000 is implemented as a potentially affected system (e.g., PAS 630) in malware detection system 600, malware detection modules 1012 can include, but are not limited to agent 632, genetic programs $634_{1-n}$, entropy encoder 636, and context information repository 633.

FIG. 11 illustrates a computing system 1100 that is arranged in a point-to-point (PtP) configuration according to an embodiment. In particular, FIG. 11 shows a system where processors, memory, and input/output devices are interconnected by a number of point-to-point interfaces. Generally, one or more of the computing devices (e.g., endpoint devices, servers, network elements, etc.) of network environment 100 may be configured in the same or similar manner as computing system 1100. In at least one embodiment, one or more of backend system 220, PAS 230, backend system 620, PAS 630, shown and described herein, may be configured in the same or similar manner as exemplary computing system 1100.

Processors 1170 and 1180 may also each include integrated memory controller logic (MC) 1172 and 1182 to communicate with memory elements 1132 and 1134. In alternative embodiments, memory controller logic 1172 and 1182 may be discrete logic separate from processors 1170 and 1180. Memory elements 1132 and/or 1134 may store various data to be used by processors 1170 and 1180 in achieving operations associated with distributed malware detection of potentially affected systems, as outlined herein.

Processors 1170 and 1180 may be any type of processor, such as those discussed with reference to processor 900 of FIG. 9, processors 228 and 238 of FIG. 2, and processors 628 and 638 of FIG. 6. Processors 1170 and 1180 may exchange data via a point-to-point (PtP) interface 1150 using point-to-point interface circuits 1178 and 1188, respectively. Processors 1170 and 1180 may each exchange data with a control logic 1190 via individual point-to-point interfaces 1152 and 1154 using point-to-point interface circuits 1176, 1186, 1194, and 1198. Control logic 1190 may also exchange data with a high-performance graphics circuit 1138 via a high-performance graphics interface 1139, using an interface circuit 1192, which could be a PtP interface circuit. In alternative embodiments, any or all of the PtP links illustrated in FIG. 11 could be implemented as a multi-drop bus rather than a PtP link.

Control logic 1190 may be in communication with a bus 1120 via an interface circuit 1196. Bus 1120 may have one or more devices that communicate over it, such as a bus bridge 1118 and I/O devices 1116. Via a bus 1110, bus bridge 1118 may be in communication with other devices such as a keyboard/mouse 1112 (or other input devices such as a touch screen, trackball, joystick, etc.), communication devices 1126 (such as modems, network interface devices, or other types of communication devices that may communicate through a computer network 1160), audio I/O devices 1114, and/or a data storage device 1128. Data storage device 1128 may store code 1130, which may be executed by processors 1170 and/or 1180. In alternative embodiments, any portions of the bus architectures could be implemented with one or more PtP links.

Processors 1170 and memory elements 1132, 1134 represent a broad range of processors, memory elements and other memory arrangements, including arrangements with single or multi-core processors of various execution speeds and power consumptions, and memory of various architectures (e.g., with one or more levels of caches) and of various types (e.g., dynamic random access, FLASH, etc.).

The computer system depicted in FIG. 11 is a schematic illustration of an embodiment of a computing system that may be utilized to implement various embodiments discussed herein. It will be appreciated that various components of the system depicted in FIG. 11 may be combined in a system-on-a-chip (SoC) architecture or in any other suitable configuration capable of achieving distributed malware detection, according to the various embodiments provided herein. Additionally, any of these components may be partitioned differently than shown or described herein to include greater or fewer integrated circuits still capable of achieving distributed malware detection according to the present disclosure.

In regards to the internal structure associated with malware detection systems 200 and 600, each of backend systems 220 and 620 and potentially affected systems 230 and 630, can include volatile and/or nonvolatile memory elements (e.g., memory elements 229, 239, 629, 639) for storing data and information, including instructions and/or logic, to be used in the operations outlined herein. Each of backend systems 220 and 620 and potentially affected systems 230 and 630 may keep data and information in any suitable memory element (e.g., random access memory (RAM), read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, an application specific integrated circuit (ASIC), or other types of nonvolatile machine-readable storage media that are capable of storing data and information), software, hardware, firmware, or in any other suitable component, device, element, or object where appropriate and based on particular needs. Any of the memory items discussed herein (e.g., memory elements 229, 239, 629, 639, 902, 1006, 1132, 1134, 1128) should be construed as being encompassed within the broad term 'memory element.' Moreover, the information being used, tracked, sent, or received in malware detection systems 200 and 600 could be provided in any repository, database, register, queue, table, cache, control list, or other storage structure, all of which can be referenced at any suitable timeframe. Any such storage options (e.g., context information repository 233, context information repository 633, GP program repository 623, device history repository 625, healthy context repository 626, and infected context repository 627) may also be included within the broad term 'memory element' as used herein.

In an example implementation, computing devices of malware detection systems 200 and 600, such as backend systems 220 and 620 and potentially affected systems 230 and 630, may include software modules (e.g., GP creation modules 222 and 622, genetic programs 224 and $634_{1-n}$, comparison module 226, agents 232 and 632, update module 234, GP selection module 621, entropy rate comparison module 624, entropy encoder 636) to achieve, or to foster, operations as outlined herein. These modules may be suitably combined or partitioned in any appropriate manner, which may be based on particular configuration and/or provisioning needs. In some embodiments, one or more of such operations may be carried out by hardware and/or firmware, implemented externally to these elements, or included in some other computing device to achieve the intended functionality. These elements may also include software (or reciprocating software) that can coordinate with other computing devices in order to achieve the operations, as outlined herein.

Additionally, each of backend systems 220 and 620 and potentially affected systems 230 and 630 may include a processor (e.g., processors 228, 238, 628, 638) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Note that with the examples provided herein, interaction may be described in terms of two, three, or more computing devices. However, this has been done for purposes of clarity and example only. In certain cases, it may be easier to describe one or more of the functionalities of a given set of flows by only referencing a limited number of computing devices. It should be appreciated that malware detection systems 200 and 600 and their teachings are readily scalable and can accommodate a large number of components, as well as more complicated/sophisticated arrangements and configurations. Accordingly, the examples provided should not limit the scope or inhibit the broad teachings of malware detection systems 200 and 600 as potentially applied to a myriad of other architectures.

It is also important to note that the operations in the preceding flowcharts and interaction diagrams (i.e., FIGS. 3-5 and 7-8) illustrate only some of the possible malware detection activities that may be executed by, or within, malware detection systems 200 and 600. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by embodiments of malware detection systems 200 and 600 in that any suitable arrangements, chronologies, configurations, and timing mechanisms may be provided without departing from the teachings of the present disclosure.

As used herein, unless expressly stated to the contrary, use of the phrase 'at least one of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements, that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. Additionally, although malware detection systems 200 and 600 have been illustrated with reference to particular elements and operations that facilitate the malware detection activities, these elements and operations may be replaced by any suitable architecture, protocols, and/or processes that achieve the intended functionality of malware detection systems 200 and/or 600.

OTHER NOTES AND EXAMPLES

Note that all optional features of the apparatuses and systems described above may also be implemented with respect to the method or process described herein and specifics in the examples may be used anywhere in one or more embodiments.

Example E1 is at least one machine readable storage medium having instructions stored thereon to detect malware, the instructions when executed by at least one processor cause the processor to: receive an entropy rate of a potentially affected system; compare the received entropy rate to an average entropy rate; and determine a probability that the potentially affected system is infected with malware, the probability based, at least in part, on a result of the comparison.

In Example E2, the subject matter of Example E1 can optionally include the received entropy rate being generated, at least in part, by a genetic program.

In Example E3, the subject matter of Example E2 can optionally include the average entropy rate being an average of one or more entropy rates of one or more respective computing devices, wherein the one or more entropy rates are generated, at least in part, by the genetic program.

In Example E4, the subject matter of Example E3 can optionally include the computing devices not being infected with malware.

In Example E5, the subject matter of any one of Examples E2 through E4 can optionally include the instructions when executed by the processor further cause the processor to select the genetic program from a repository of genetic programs, and provide the genetic program to the potentially affected system.

In Example E6, the subject matter of any one of Examples E2 through E5 can optionally include the instructions when executed by the processor further cause the processor to provide a specified time-span associated with the genetic program, wherein the specified time-span indicates an amount of time to observe context information on the potentially affected system.

In Example E7, the subject matter of any one of Examples E1 through E6 can optionally include the result of the comparison including an indicator of whether the received entropy rate correlates to an infected system or a healthy system.

In Example E8, the subject matter of Example E7 can optionally include the instructions when executed by the processor further cause the processor to evaluate the indicator together with one or more other indicators, the one or more other indicators being previously determined.

In Example E9, the subject matter of Example E8 can optionally include the one or more other indicators having been determined based, at least in part, on one or more other respective entropy rates of the potentially affected system, wherein the received entropy rate was generated, at least in part, by a genetic program, and wherein the one or more other entropy rates were generated, at least in part, by one or more other respective genetic programs.

In Example E10, the subject matter of any one of Examples E1 through E9 can optionally include the instructions when executed by the processor further cause the processor to take an action based, at least in part, on the probability of infection.

In Example E11, the subject matter of Example E10 can optionally include the action being taken if the probability of infection reaches a predetermined threshold.

In Example E12, the subject matter of Example E10 can optionally include the action being taken if the probability of infection increases relative to a previous probability of infection or an expected probability of infection.

In Example E13, the subject matter of any one of Examples E10 through E12 can optionally include the action being one of a set of predefined actions that are taken as the probability of infection increases.

In Example E14, the subject matter of any one of Examples E1 through E13 can optionally include the instructions when executed by the processor further cause the processor to: select one or more genetic programs from a repository of genetic programs, wherein the selection of the one or more genetic programs is based, at least in part, on the probability of infection; and provide the selected one or more genetic programs to the potentially affected system.

In Example E15, the subject matter of Example E14 can optionally include at least one of the genetic programs being configured to detect a specific type of malware.

Example E16 is a system to detect malware, the system comprising: at least one processor; at least one memory element; and an entropy rate comparison module configured to receive an entropy rate of a potentially affected system in a network environment; compare the received entropy rate to an average entropy rate; and determine a probability that the potentially affected system is infected with malware, the probability based, at least in part, on a result of the comparison.

In Example E17, the subject matter of Example E16 can optionally include the received entropy rate being generated, at least in part, by a genetic program.

In Example E18, the subject matter of Example E17 can optionally include the system being further configured to determine the average entropy rate, wherein the average entropy rate is an average of one or more entropy rates of one or more respective computing devices, wherein the one or more entropy rates are generated, at least in part, by the genetic program.

In Example E19, the subject matter of Example E18 can optionally include the computing devices not being infected with malware.

In Example E20, the subject matter of any one of Examples E17 through E19 can optionally include the system further comprising a genetic program selection module configured to select the genetic program from a repository of genetic programs; and provide the genetic program to the potentially affected system.

In Example E21, the subject matter of Example E20 can optionally include the genetic program selection module being further configured to provide a specified time-span associated with the genetic program, wherein the specified time-span indicates an amount of time to observe context information on the potentially affected system.

In Example E22, the subject matter of any one of Examples E16 through E21 can optionally include the result of the comparison including an indicator of whether the received entropy rate correlates to an infected system or a healthy system.

In Example E23, the subject matter of Example E22 can optionally include the entropy rate comparison module being further configured to evaluate the indicator together with one or more other indicators, the one or more other indicators being previously determined.

In Example E24, the subject matter of Example E23 can optionally include the one or more other indicators having been determined based, at least in part, on one or more other respective entropy rates of the potentially affected system, wherein the received entropy rate was generated, at least in part, by a genetic program, and wherein the one or more other entropy rates were generated, at least in part, by one or more other respective genetic programs.

In Example E25, the subject matter of any one of Examples E16 through E24 can optionally include the system being further configured to take an action based, at least in part, on the probability of infection.

In Example E26, the subject matter of Example E25 can optionally include the action being taken if the probability of infection reaches a predetermined threshold.

In Example E27, the subject matter of Example E25 can optionally include the action being taken if the probability of infection increases relative to a previous probability of infection or an expected probability of infection.

In Example E28, the subject matter of any one of Examples E25 through E27 can optionally include the action being one of a set of predefined actions that are taken as the probability of infection increases.

In Example E29, the subject matter of any one of Examples E20 through E21 can optionally include the genetic program selection module being further configured to: select one or more genetic programs from a repository of genetic programs, wherein the selection of the one or more genetic programs is based, at least in part, on the probability of infection; and provide the selected one or more genetic programs to the potentially affected system.

In Example E30, the subject matter of Example E29 can optionally include at least one of the genetic programs being configured to detect a specific type of malware.

Example E31 is a method for detecting malware, the method comprising: receiving an entropy rate of a potentially affected system; comparing the received entropy rate to an average entropy rate; and determining a probability that the potentially affected system is infected with malware, the probability based, at least in part, on a result of the comparison.

In Example E32, the subject matter of Example E31 can optionally include the received entropy rate being generated, at least in part, by a genetic program.

In Example E33, the subject matter of Example E32 can optionally include the average entropy rate being an average of one or more entropy rates of one or more respective computing devices, wherein the one or more entropy rates are generated, at least in part, by the genetic program.

In Example E34, the subject matter of Example E33 can optionally include the computing devices not being infected with malware.

In Example E35, the subject matter of any one of Examples E32 through E34 can optionally include selecting the genetic program from a repository of genetic programs, and providing the genetic program to the potentially affected system.

In Example E36, the subject matter of any one of Examples E32 through E35 can optionally include providing a specified time-span associated with the genetic program, wherein the specified time-span indicates an amount of time to observe context information on the potentially affected system.

In Example E37, the subject matter of any one of Examples E31 through E36 can optionally include the result of the comparison including an indicator of whether the received entropy rate correlates to an infected system or a healthy system.

In Example E38, the subject matter of Example E37 can optionally include evaluating the indicator together with one or more other indicators, the one or more other indicators being previously determined.

In Example E39, the subject matter of Example E38 can optionally include the one or more other indicators having been determined based, at least in part, on one or more other respective entropy rates of the potentially affected system, wherein the received entropy rate was generated, at least in part, by a genetic program, and wherein the one or more other entropy rates were generated, at least in part, by one or more other respective genetic programs.

In Example E40, the subject matter of any one of Examples E31 through E39 can optionally include taking an action based, at least in part, on the probability of infection.

In Example E41, the subject matter of Example E40 can optionally include the action being taken if the probability of infection reaches a predetermined threshold.

In Example E42, the subject matter of Example E40 can optionally include the action being taken if the probability of infection increases relative to a previous probability of infection or an expected probability of infection.

In Example E43, the subject matter of any one of Examples E40 through E42 can optionally include the action being one of a set of predefined actions that are taken as the probability of infection increases.

In Example E44, the subject matter of any one of Examples E31 through E43 can optionally include selecting one or more genetic programs from a repository of genetic programs, wherein the selection of the one or more genetic programs is based, at least in part, on the probability of infection; and providing the selected one or more genetic programs to the potentially affected system.

In Example E45, the subject matter of Example E44 can optionally include at least one of the genetic programs being configured to detect a specific type of malware.

Example E46 is a system comprising means for performing the method of any one of Examples E31-E45.

In Example E47, the subject matter of Example E46 can optionally include the means for performing the method comprising at least one processor and at least one memory element.

In Example E48, the subject matter of Example E47 can optionally include the memory element comprising machine-readable instructions, that when executed cause the system to perform the method of any one of Examples E31-E45.

In Example E49, the subject matter of any one of Examples E46 through E48 can optionally include the system being a computing device.

Example E50 is at least one machine readable storage medium comprising instructions that, when executed, implement a method or realize a system as described in any one of the preceding Examples E1-E49.

Example E51 includes at least one machine readable storage medium having instructions stored thereon to detect malware, the instructions when executed by at least one processor cause the processor to: generate one or more streams of context information of a potentially affected system for one or more events; execute a genetic program to produce an output stream of manipulated context information based, at least in part, on the one or more streams; apply entropy encoding to the output stream to generate an entropy rate; and communicate the entropy rate to a backend system to determine whether the potentially affected system is an infected system.

In Example E52, the subject matter of Example E51 can optionally include the instructions when executed by the processor further cause the processor to detect one or more events on the potentially affected system, wherein each of the one or more streams corresponds to a different one of the events.

In Example E53, the subject matter of any one of Examples E51 through E52 can optionally include the instructions when executed by the processor further cause the processor to manipulate the one or more streams to produce the output stream of manipulated context information.

In Example E54, the subject matter of Example E53 can optionally include the manipulation including performing at least one of deleting, sorting, adding, combining, and encrypting at least one context element of at least one of the streams.

In Example E55, the subject matter of any one of Examples E53 through E54 can optionally include the instructions when executed by the processor further cause the processor to receive a second genetic program to execute, wherein the second genetic program is configured to produce a new output stream by manipulating one or more new streams, wherein the manipulation of the one or more new streams is different than the manipulation of the other one or more streams.

In Example E56, the subject matter of Example E55 can optionally include the instructions when executed by the processor further cause the processor to receive a first time-span indicating an amount of time to observe the context information to provide to the genetic program.

In Example E57, the subject matter of Example E56 can optionally include the instructions when executed by the processor further cause the processor to receive a second time-span indicating an amount of time to observe the new context information to provide to the second genetic program, wherein the second time-span begins before the first time-span expires.

Example E58 is a system comprising: at least one processor; at least one memory element; and an agent configured to: generate one or more streams of context information of the system for one or more events; execute a genetic program to produce an output stream of manipulated context information based, at least in part, on the one or more streams; apply entropy encoding to the output stream to generate an entropy rate; and communicate the entropy rate to a backend system to determine whether the system is an infected system.

In Example E59, the subject matter of Example E58 can optionally include the agent being further configured to detect one or more events on the system, wherein each of the one or more streams corresponds to a different one of the events.

In Example E60, the subject matter of any one of Examples E58 through E59 can optionally include the genetic program being configured to manipulate the one or more streams to produce the output stream of manipulated context information.

In Example E61, the subject matter of Example E60 can optionally include the manipulation including performing at least one of deleting, sorting, adding, combining, and encrypting at least one context element of at least one of the streams.

In Example E62, the subject matter of any one of Examples E60 through E61 can optionally include the agent being further configured to receive a second genetic program to execute, wherein the second genetic program is configured to produce a new output stream by manipulating one or more new streams, wherein the manipulation of the one or more new streams is different than the manipulation of the other one or more streams.

In Example E63, the subject matter of Example E62 can optionally include the agent being further configured to receive a first time-span indicating an amount of time to observe the context information to provide to the genetic program.

In Example E64, the subject matter of Example E63 can optionally include the agent being further configured to receive a second time-span indicating an amount of time to observe the new context information to provide to the second genetic program, wherein the second time-span begins before the first time-span expires.

Example E65 is a method for detecting malware, the method comprising: generating one or more streams of context information of a potentially affected system for one or more events; executing a genetic program to produce an output stream of manipulated context information based, at least in part, on the one or more streams; applying entropy encoding to the output stream to generate an entropy rate; and communicating the entropy rate to a backend system to determine whether the potentially affected system is an infected system.

In Example E66, the subject matter of Example E65 can optionally include detecting one or more events on the potentially affected system, wherein each of the one or more streams corresponds to a different one of the events.

In Example E67, the subject matter of any one of Examples E65 through E66 can optionally include manipulating the one or more streams to produce the output stream of manipulated context information.

In Example E68, the subject matter of Example E67 can optionally include the manipulation including performing at least one of deleting, sorting, adding, combining, and encrypting at least one context element of at least one of the streams.

In Example E69, the subject matter of any one of Examples E67 through E68 can optionally include receiving a second genetic program to execute, wherein the second genetic program is configured to produce a new output stream by manipulating one or more new streams, and wherein the manipulation of the one or more new streams is different than the manipulation of the other one or more streams.

In Example E70, the subject matter of Example E69 can optionally include receiving a first time-span indicating an amount of time to observe the context information to provide to the genetic program.

In Example E71, the subject matter of Example E70 can optionally include receiving a second time-span indicating an amount of time to observe the new context information to provide to the second genetic program, wherein the second time-span begins before the first time-span expires.

Example E72 is a system comprising means for performing the method of any one of Examples E65-E71.

In Example E73, the subject matter of Example E72 can optionally include the means for performing the method comprising at least one processor and at least one memory element.

In Example E74, the subject matter of Example E73 can optionally include the memory element comprising machine-readable instructions, that when executed cause the system to perform the method of any one of Examples E65-E71.

Example E75 is at least one machine readable storage medium comprising instructions that, when executed, implement a method or realize a system as described in any one of the preceding Examples E51-E74.

Example T1 is at least one machine readable storage medium having instructions stored thereon for detecting malware, the instructions when executed by at least one processor cause the processor to: receive context information related to a potentially affected system; create a prediction of normal traffic based, at least in part, on the received context information; compare observed network traffic to the prediction of normal traffic; and take an action based, at least in part, on the comparison.

In Example T2, the subject matter of Example T1 can optionally include the action being taken if the observed network traffic is not within an acceptable deviation range of the prediction of normal traffic.

In Example T3, the subject matter of Example T2 can optionally include the acceptable deviation range being based, at least in part, on a type of network traffic.

In Example T4, the subject matter of any one of Examples T2 through T3 can optionally include the acceptable deviation range being based, at least in part, on a volume of network traffic.

In Example T5, the subject matter of Example T1 can optionally include the action being taken based, at least in part, on a degree of deviation of the observed network traffic from the prediction of normal traffic.

In Example T6, the subject matter of Example T5 can optionally include the degree of deviation being based, at least in part, on a type of network traffic.

In Example T7, the subject matter of any one of Examples T5 through T6 can optionally include the degree of deviation being based, at least in part, on a volume of network traffic.

In Example T8, the subject matter of any one of Examples T1 through T7 can optionally include the instructions when executed by the processor further cause the processor to create a genetic program based, at least in part, on one or more instances of previously received context information and one or more previously observed network traffic patterns, wherein the genetic program is configured to create the prediction.

In Example T9, the subject matter of Example T8 can optionally include the instructions when executed by the processor further cause the processor to update the genetic program if the network traffic indicates a gradual change from the prediction of normal traffic.

Example T10 is a system for detecting malware, the system comprising: at least one processor; at least one memory element; and a comparison module configured to: receive context information related to a potentially affected system; create a prediction of normal traffic based, at least in part, on the received context information; compare observed network traffic to the prediction of normal traffic; and take an action based, at least in part, on the comparison.

In Example T11, the subject matter of Example T10 can optionally include the action being taken if the observed network traffic is not within an acceptable deviation range of the prediction of normal traffic.

In Example T12, the subject matter of Example T11 can optionally include the acceptable deviation range being based, at least in part, on a type of network traffic.

In Example T13, the subject matter of any one of Examples T11 through T12 can optionally include the acceptable deviation range being based, at least in part, on a volume of network traffic.

In Example T14, the subject matter of Example T10 can optionally include the action being taken based, at least in part, on a degree of deviation of the observed network traffic from the prediction of normal traffic.

In Example T15, the subject matter of Example T14 can optionally include the degree of deviation being based, at least in part, on a type of network traffic.

In Example T16, the subject matter of any one of Examples T14 through T15 can optionally include the degree of deviation being based, at least in part, on a volume of network traffic.

In Example T17, the subject matter of any one of Examples T10 through T16 can optionally include a genetic program creation module configured to create a genetic program based, at least in part, on one or more instances of previously received context information and one or more previously observed network traffic patterns, wherein the genetic program is configured to create the prediction.

In Example T18, the subject matter of Example T17 can optionally include the genetic program creation module further configured to update the genetic program if the network traffic indicates a gradual change from the prediction of normal traffic.

Example T19 is a method for detecting malware, comprising: receiving context information related to a potentially affected system; creating a prediction of normal traffic based, at least in part, on the received context information; comparing observed network traffic to the prediction of normal traffic; and taking an action based, at least in part, on the comparison.

In Example T20, the subject matter of Example T19 can optionally include the action being taken if the observed network traffic is not within an acceptable deviation range of the prediction of normal traffic.

In Example T21, the subject matter of Example T20 can optionally include the acceptable deviation range being based, at least in part, on a type of network traffic.

In Example T22, the subject matter of any one of Examples T20 through T21 can optionally include the acceptable deviation range being based, at least in part, on a volume of network traffic.

In Example T23, the subject matter of Example T19 can optionally include the action being taken based, at least in part, on a degree of deviation of the observed network traffic from the prediction of normal traffic.

In Example T24, the subject matter of Example T23 can optionally include the degree of deviation being based, at least in part, on a type of network traffic.

In Example T25, the subject matter of any one of Examples T23 through T24 can optionally include the degree of deviation being based, at least in part, on a volume of network traffic.

In Example T26, the subject matter of any one of Examples T19 through T25 can optionally include creating a genetic program based, at least in part, on one or more instances of previously received context information and one or more previously observed network traffic patterns, wherein the genetic program is configured to create the prediction.

In Example T27, the subject matter of Example T26 can optionally include updating the genetic program if the network traffic indicates a gradual change from the prediction of normal traffic.

Example T28 is a system comprising means for performing the method of any one of Examples T19-T27.

In Example T29, the subject matter of Example T28 can optionally include the means for performing the method comprising at least one processor and at least one memory element.

In Example T30, the subject matter of Example T29 can optionally include the memory element comprising machine-readable instructions, that when executed cause the system to perform the method of any one of Examples T19-T27.

Example T31 is at least one machine readable storage medium comprising instructions that, when executed, implement a method or realize a system as described in any one of the preceding Examples T1-T30.

What is claimed is:

1. At least one non-transitory machine readable storage medium having instructions stored thereon to detect malware, the instructions when executed by at least one processor cause the processor to:
   select a genetic program based, at least in part, on a type of manipulation to be performed by the genetic program on one or more streams of context information of a potentially affected system;
   receive an entropy rate associated with the potentially affected system, wherein the received entropy rate was generated, at least in part, from an output stream of manipulated context information produced by the genetic program manipulating one or more streams of context information related to, respectively, one or more events detected on the potentially affected system, wherein a first stream of the one or more streams of context information includes one or more context elements observed in response to a first event being detected on the potentially affected system;
   compare the received entropy rate to an average entropy rate; and
   determine a probability that the potentially affected system is infected with malware, the probability based, at least in part, on a result of the comparison.

2. The medium of claim 1, wherein the average entropy rate is an average of one or more entropy rates of one or more respective computing devices, wherein the one or more entropy rates are generated, at least in part, by the genetic program.

3. The medium of claim 1, wherein the instructions when executed by the processor further cause the processor to:
   provide the genetic program to the potentially affected system for execution on the potentially affected system.

4. The medium of claim 1, wherein the instructions when executed by the processor further cause the processor to:
   provide a specified time-span associated with the genetic program, wherein the specified time-span indicates an amount of time to observe context information on the potentially affected system.

5. The medium of claim 1, wherein the result of the comparison includes an indicator of whether the received entropy rate correlates to an infected system or a healthy system.

6. The medium of claim 5, wherein the instructions when executed by the processor further cause the processor to:
   evaluate the indicator together with one or more other indicators, the one or more other indicators being previously determined.

7. The medium of claim 6, wherein the one or more other indicators were determined based, at least in part, on one or more other respective entropy rates of the potentially affected system, wherein the one or more other entropy rates were generated, at least in part, by one or more other respective genetic programs.

8. The medium of claim 1, wherein the instructions when executed by the processor further cause the processor to:
   take an action based, at least in part, on the probability of infection.

9. The medium of claim 8, wherein the action is taken based on the probability of infection relative to a predetermined threshold.

10. The medium of claim 8, wherein the action is taken if the probability of infection increases relative to a previous probability of infection or an expected probability of infection.

11. The medium of claim 10, wherein the action is one of a set of predefined actions that are taken as the probability of infection increases.

12. The medium of claim 1, wherein the instructions when executed by the processor further cause the processor to:
   select one or more genetic programs from a repository of genetic programs, wherein the selection of the one or more genetic programs is based, at least in part, on the probability of infection; and
   provide the selected one or more genetic programs to the potentially affected system.

13. The medium of claim 12, wherein at least one of the genetic programs is configured to detect a specific type of malware.

14. A system to detect malware, the apparatus comprising:
   at least one processor;
   at least one memory element; and
   an entropy rate comparison module configured to:
      select a genetic program based, at least in part, on a type of manipulation to be performed by the genetic program on one or more streams of context information of a potentially affected system;
      receive an entropy rate associated with the potentially affected system in a network environment, wherein the received entropy rate was generated, at least in part, from an output stream of manipulated context information produced by the genetic program manipulating one or more streams of context information related to, respectively, one or more events detected on the potentially affected system, wherein a first stream of the one or more streams of context information includes one or more context elements observed in response to a first event being detected on the potentially affected system;
      compare the received entropy rate to an average entropy rate; and
      determine a probability that the potentially affected system is infected with malware, the probability based, at least in part, on a result of the comparison.

15. The system of claim 14, further comprising a genetic program selection module configured to:
   provide the genetic program to the potentially affected system for execution on the potentially affected system.

16. A method for detecting malware, the method comprising:
   selecting a genetic program based, at least in part, on a type of manipulation to be performed by the genetic program on one or more streams of context information of a potentially affected system;
   receiving an entropy rate associated with the potentially affected system, wherein the received entropy rate was generated, at least in part, from an output stream of manipulated context information produced by the genetic program manipulating one or more streams of context information related to, respectively, one or more events detected on the potentially affected system, wherein a first stream of the one or more streams of context information includes one or more context elements observed in response to a first event being detected on the potentially affected system;
   comparing the received entropy rate to an average entropy rate; and
   determining a probability that the potentially affected system is infected with malware, the probability based, at least in part, on a result of the comparison.

17. The method of claim 16, further comprising:
   taking an action based, at least in part, on the probability of infection.

18. A system comprising:
   at least one processor;
   at least one memory element; and
   an agent, when executed by the at least one processor,
      detect one or more events on a potentially affected system in real-time;
      generate one or more streams of context information corresponding to, respectively, the one or more events, wherein each stream of context information includes one or more context elements observed on the potentially affected system in response to one of the one or more events being detected;
      execute a genetic program to manipulate the one or more streams to produce an output stream of manipulated context information based, at least in part, on the manipulation of the one or more streams;
      generate an entropy rate by applying entropy encoding to the output stream of manipulated context information produced by the genetic program; and
      communicate the entropy rate to a backend system to determine whether the system is an infected system.

19. The system of claim 18, wherein the manipulation includes performing at least one of deleting, sorting, adding, combining, and encrypting at least one context element of at least one of the streams.

20. The system of claim 18, wherein the agent is further configured to:
   receive a second genetic program to execute, wherein the second genetic program is configured to produce a new output stream by manipulating one or more new streams, wherein the manipulation of the one or more new streams is different than the manipulation of the other one or more streams.

21. At least one non-transitory machine readable storage medium having instructions stored thereon to detect malware, the instructions when executed by at least one processor cause the processor to:
   detect one or more events on a potentially affected system in real-time;
   generate one or more streams of context information corresponding to, respectively, the one or more events, wherein each stream of context information includes one or more context elements observed on the potentially affected system in response to one of the one or more events being detected;
   execute a genetic program to manipulate the one or more streams to produce an output stream of manipulated context information based, at least in part, on the manipulation of the one or more streams;
   generate an entropy rate by applying entropy encoding to the output stream of manipulated context information produced by the genetic program; and
   communicate the entropy rate to a backend system to determine whether the system is an infected system.

22. The medium of claim 21, wherein the instructions when executed by the processor further cause the processor to:
   receive a second genetic program to execute, wherein the second genetic program is configured to produce a new output stream by manipulating one or more new streams, wherein the manipulation of the one or more new streams is different than the manipulation of the other one or more streams.

23. The system of claim 14, wherein the genetic program selection module is further configured to:

provide a specified time-span associated with the genetic program, wherein the specified time-span indicates an amount of time to observe context information on the potentially affected system.

24. The medium of claim 1, wherein a second stream of the one or more streams of context information includes one or more other context elements observed in response to a second event being detected on the potentially affected system.

25. The medium of claim 1, wherein the one or more context elements are related to the functioning of the potentially affected system when the first event is detected.

* * * * *